(12) United States Patent
Suzuki et al.

(10) Patent No.: US 11,239,571 B2
(45) Date of Patent: Feb. 1, 2022

(54) ANTENNA DEVICE

(71) Applicant: Sony Corporation, Tokyo (JP)

(72) Inventors: Yuichiro Suzuki, Tokyo (JP); Shen Wang, Tokyo (JP); Takayoshi Ito, Tokyo (JP); Toru Ozone, Tokyo (JP); Jin Sato, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/755,160

(22) PCT Filed: Jul. 5, 2018

(86) PCT No.: PCT/JP2018/025551
§ 371 (c)(1),
(2) Date: Apr. 10, 2020

(87) PCT Pub. No.: WO2019/077813
PCT Pub. Date: Apr. 25, 2019

(65) Prior Publication Data
US 2020/0303834 A1 Sep. 24, 2020

(30) Foreign Application Priority Data
Oct. 19, 2017 (JP) .............................. JP2017-202692

(51) Int. Cl.
*H01Q 9/28* (2006.01)
*H01Q 21/24* (2006.01)

(52) U.S. Cl.
CPC .............. *H01Q 21/24* (2013.01); *H01Q 9/28* (2013.01)

(58) Field of Classification Search
CPC ................................. H01Q 21/24; H01Q 9/28
See application file for complete search history.

(56) References Cited

U.S. PATENT DOCUMENTS

| 6,456,242 B1 | 9/2002 | Crawford |
| 2002/0122006 A1 | 9/2002 | Crawford |
| (Continued) | | |

FOREIGN PATENT DOCUMENTS

| CN | 101459285 A | 6/2009 |
| CN | 105103374 A | 11/2015 |
| (Continued) | | |

OTHER PUBLICATIONS

International Search Report and Written Opinion dated Sep. 25, 2018 for PCT/JP2018/025551 filed on Jul. 5, 2018, 9 pages including English Translation of the International Search Report.
(Continued)

*Primary Examiner* — Graham P Smith
(74) *Attorney, Agent, or Firm* — Xsensus, LLP

(57) ABSTRACT

Even a thin communication device is enabled to transmit or receive a polarized wave having a polarization direction substantially coinciding with a thickness direction of the communication device.
An antenna device includes a first substrate extending in a first direction, a second substrate supported on the first substrate, and extending in both the first direction and a second direction orthogonal to the first direction, and an antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction.

18 Claims, 30 Drawing Sheets

(56) References Cited

U.S. PATENT DOCUMENTS

| | | |
|---|---|---|
| 2002/0175862 A1 | 11/2002 | Hunter et al. |
| 2009/0143038 A1 | 6/2009 | Saito |
| 2009/0322620 A1 | 12/2009 | Pedersen et al. |
| 2011/0115677 A1 | 5/2011 | Rao |
| 2011/0188552 A1 | 8/2011 | Yoon et al. |
| 2013/0050056 A1 | 2/2013 | Lee et al. |
| 2013/0257668 A1 | 10/2013 | Rao et al. |
| 2016/0064829 A1* | 3/2016 | Schaepperle .......... H01Q 21/24 343/893 |
| 2016/0087348 A1 | 3/2016 | Ko et al. |
| 2017/0250458 A1 | 8/2017 | Diebold et al. |

FOREIGN PATENT DOCUMENTS

| | | |
|---|---|---|
| CN | 204947073 U | 1/2016 |
| EP | 1237225 A1 | 9/2002 |
| EP | 2787576 A1 | 10/2014 |
| EP | 3598579 A1 | 1/2020 |
| EP | 3641060 A1 | 4/2020 |
| JP | 61-50542 B2 | 11/1986 |
| JP | 2001-332929 A | 11/2001 |
| JP | 2002-135044 A | 5/2002 |
| JP | 2002-330026 A | 11/2002 |
| JP | 2004-274418 A | 9/2004 |
| JP | 2007-027902 A | 2/2007 |
| JP | 2007279027 A | 10/2007 |
| JP | 2009-141961 A | 6/2009 |
| JP | 2011-010081 A | 1/2011 |
| JP | 2011100811 A | 5/2011 |
| JP | 2011100816 A | 5/2011 |
| JP | 2011100817 A | 5/2011 |
| JP | 2014-093599 A | 5/2014 |
| JP | 2014150226 A | 8/2014 |
| JP | 2014-529971 A | 11/2014 |
| JP | 2015-210766 A | 11/2015 |
| JP | 2016-515782 A | 5/2016 |
| JP | 2017-157907 A | 9/2017 |
| WO | 2018/030753 A1 | 2/2018 |

OTHER PUBLICATIONS

Samsung et al., "On band definition for 26.5-29.5GHz," 3GPP TSG-RAN WG4 Meeting #83, R4-1704770, Hangzhou, China, May 15-19, 2017, 4 pages.

Hong, W. et al., "Millimeter-wave 5G Antennas for Smartphones: Overview and Experimental Demonstration," IEEE Transactions on Antennas and Propagation, 2017 IEEE, 12 pages.

Extended European search report dated Oct. 12, 2020, in corresponding European patent Application No. 18867642.3, 9 pages.

Chinese Office Action dated Dec. 22, 2020, in corresponding Chinese Patent Application No. 201880066099.1.

\* cited by examiner

FIG. 26
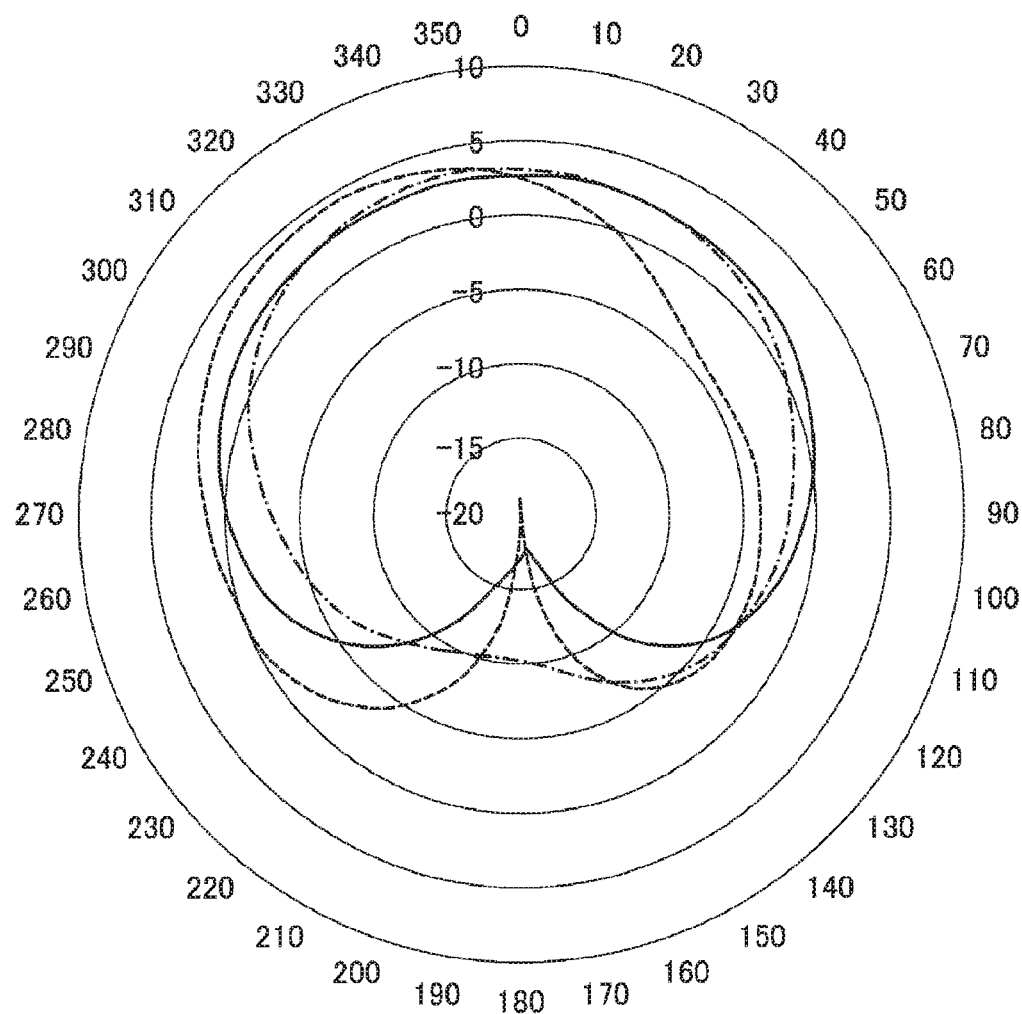
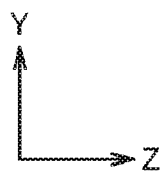

ANTENNA DEVICE

CROSS-REFERENCE TO RELATED APPLICATIONS

The present application is based on PCT filing PCT/JP2018/025551, filed Jul. 5, 2018, which claims priority to JP 2017-202692, filed Oct. 19, 2017, the entire contents of each are incorporated herein by reference.

TECHNICAL FIELD

The present disclosure relates to an antenna device.

BACKGROUND ART

In a mobile communication system based on a communication standard called LTE/LTE-advanced (A), a wireless signal having a frequency called ultra high frequency around 700 MHz to 3.5 GHz is mainly used for communication.

Furthermore, in communication using ultra-high frequencies like the above-described communication standard, a so-called multiple-input and multiple-output (MIMO) technology is adopted to further improve communication performance using reflected waves in addition to direct waves in signal transmission/reception even under a fading environment. Since a plurality of antennas is used in MIMO, various techniques for arranging the plurality of antennas in a more favorable mode for mobile communication terminal devices such as smartphones have been studied.

CITATION LIST

Non-Patent Document

Non-Patent Document 1: Samsung, SK Telecom, K T Corporation, LG Uplus, NTT DOCOMO, INC., "On band definition for 26.5-29.5 GHz", R4-1704770, 3GPP TSG RAN WG4 Meeting #83, Hangzhou, China 15-19 May 2017

Non-Patent Document 2: Wonbin Hong, and four others, "Millimeter-wave 5G Antennas for Smartphones: Overview and Experimental Demonstration", [online], Aug. 17, 2015, IEEE, [searched on Oct. 3, 2015], Internet <URL: http://ieeexplore.ieee.org/document/8012469/>

SUMMARY OF THE INVENTION

Problems to be Solved by the Invention

By the way, in recent years, various studies have been made on a fifth generation (5G) mobile communication system following LTE/LTE-A. For example, in the mobile communication system, use of communication using a wireless signal (hereinafter also simply referred to as "millimeter wave") having a frequency called millimeter wave such as 28 GHz or 39 GHz is being studied. For example, in Non-Patent Document 1, use of a millimeter wave for a mobile communication system has been studied.

The millimeter wave can increase the amount of information to be transmitted as compared with the ultra high frequency wave, but the millimeter wave has high straightness and tends to increase propagation loss and reflection loss. For this reason, in wireless communication using the millimeter wave, it has been found that direct waves mainly contribute to communication characteristics and are hardly affected by reflected waves. From such characteristics, in the 5G mobile communication system, introduction of a technology called polarization MIMO, which implements MIMO using a plurality of polarized waves (for example, a horizontal polarized wave and a vertical polarized wave) with different polarization directions from one another, is being discussed. From such a background, adoption of the polarization MIMO is also demanded for communication devices configured to be movable, such as mobile communication terminal devices.

Meanwhile, in recent years, communication devices such as smartphones have become thinner, and a mount space for antennas for wireless communication tends to be limited. For example, in Non-Patent Document 2, mounting of an antenna accompanying a reduction in the thickness of a communication device has been studied.

From such a background, mounting an antenna device for transmitting or receiving a polarized wave having a polarization direction substantially coinciding with a thickness direction of the communication device tends to be difficult in implementing the polarization MIMO.

Therefore, the present disclosure proposes a technology of enabling even a thin communication device to transmit or receive a polarized wave having a polarization direction substantially coinciding with a thickness direction of the communication device.

Solutions to Problems

According to the present disclosure, provided is an antenna device including a first substrate extending in a first direction, a second substrate supported on the first substrate, and extending in both the first direction and a second direction orthogonal to the first direction, and an antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction.

Effects of the Invention

As described above, according to the present disclosure, a technology of enabling even a thin communication device to transmit or receive a polarized wave having a polarization direction substantially coinciding with a thickness direction of the communication device is provided.

Note that the above-described effect is not necessarily limited, and any of effects described in the present specification or another effect that can be grasped from the present specification may be exerted in addition to or in place of the above-described effect.

BRIEF DESCRIPTION OF DRAWINGS

FIG. 26 is a graph illustrating an example of simulation results of the radiation patterns in the vertical direction of the antenna device according to the sixth configuration example of the embodiment.

MODE FOR CARRYING OUT THE INVENTION

Favorable embodiments of the present disclosure will be described in detail with reference to the appended drawings. Note that, in the present specification and drawings, redundant description of configuration elements having substantially the same functional configuration is omitted by providing the same sign.

Note that the description will be given in the following order.

1. Schematic Configuration
1.1. Example of System Configuration
1.2. Configuration Example of Terminal Device
2. Study on Communication Using Millimeter Wave
3. Technical Characteristics
3.1. Comparative Example
3.2. Schematic Configuration
3.3. Configuration Example of Antenna Device
   3.3.1. First Configuration Example
   3.3.2. Second Configuration Example
   3.3.3. Third Configuration Example
   3.3.4. Fourth Configuration Example
   3.3.5. Fifth Configuration Example
   3.3.6. Sixth Configuration Example
   3.3.7. Seventh Configuration Example
3.4. Example
3.5. Application
4. Conclusion

1. SCHEMATIC CONFIGURATION

1.1. Example of System Configuration

Figure 1:
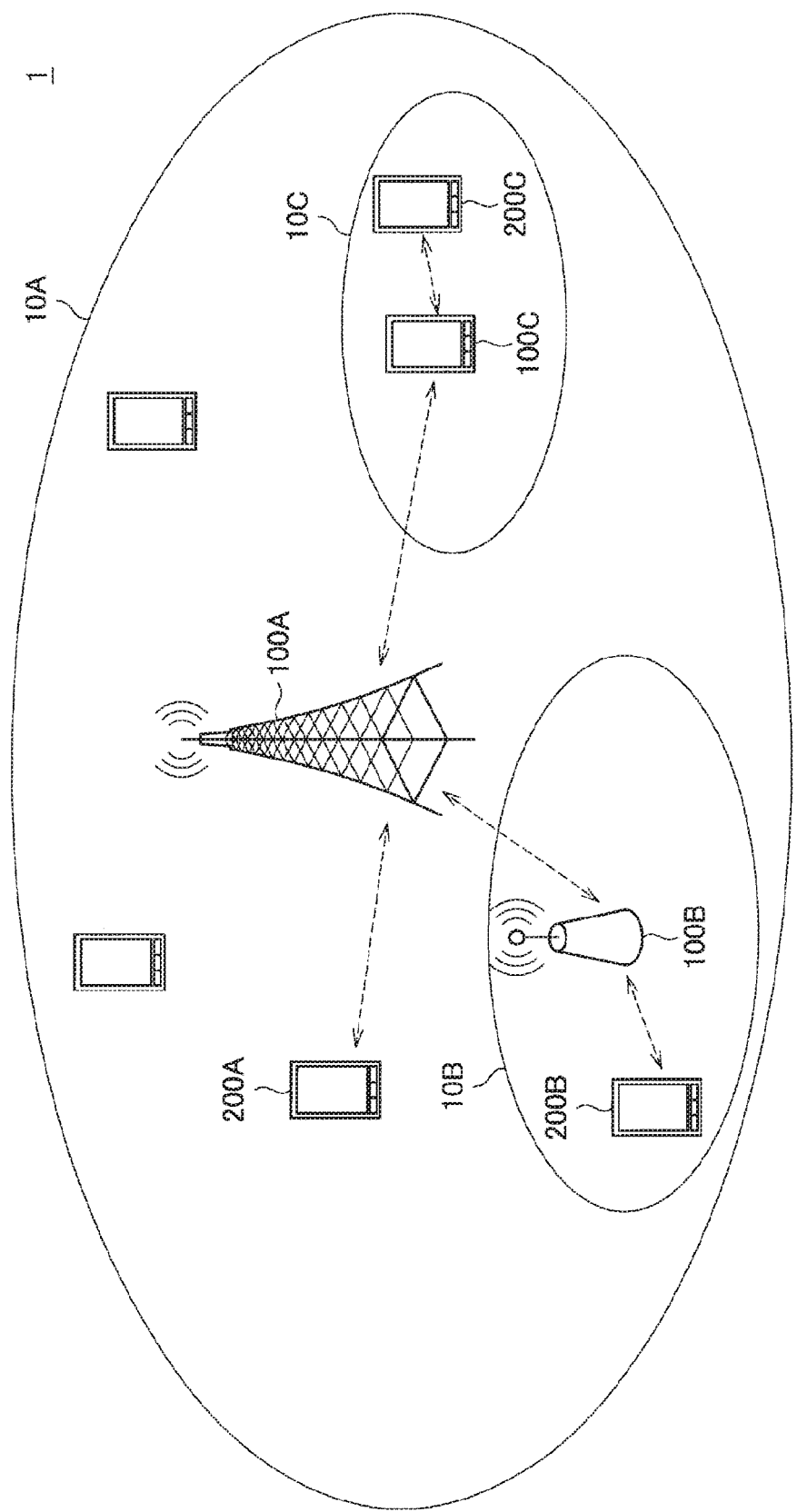
FIG. 1 is an explanatory diagram for describing an example of a schematic configuration of a system according to an embodiment of the present disclosure.

First, an example of a schematic configuration of a system 1 according to an embodiment of the present disclosure will be described with reference to FIG. 1. FIG. 1 is an explanatory diagram for describing an example of a schematic configuration of the system 1 according to an embodiment of the present disclosure. As illustrated in FIG. 1, the system 1 includes a wireless communication device 100 and a terminal device 200. Here, the terminal device 200 is also called user. The user may also be referred to as a UE. A wireless communication device 100C is also called UE-Relay. The UE here may be a UE defined in LTE or LTE-A, and the UE-Relay may be a Prose UE to Network Relay discussed in 3GPP and more generally may mean communication equipment.

(1) Wireless Communication Device 100

The wireless communication device 100 is a device that provides a wireless communication service to subordinate devices. For example, a wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station through, for example, an X2 interface, and can transmit and receive control information and the like. Furthermore, the base station 100A is logically connected to a so-called core network (not illustrated) through, for example, an S1 interface, and can transmit and receive control information and the like. Note that the communication between these devices can be physically relayed by various devices.

Here, the wireless communication device 100A illustrated in FIG. 1 is a macro cell base station, and the cell 10A is a macro cell. Meanwhile, wireless communication devices 100B and 100C are master devices that operate small cells 10B and 10C, respectively. As an example, the master device 100B is a small cell base station that is fixedly installed. The small cell base station 100B establishes a wireless backhaul link with the macro cell base station 100A, and an access link with one or more terminal devices (for example, a terminal device 200B) in the small cell 10B. Note that the wireless communication device 100B may be a relay node defined by 3GPP. The master device 100C is a dynamic access point (AP). The dynamic AP 100C is a mobile device that dynamically operates the small cell 10C. The dynamic AP 100C establishes a wireless backhaul link with the macro cell base station 100A, and an access link with one or more terminal devices (for example, a terminal device 200C) in the small cell 10C. The dynamic AP 100C may be a terminal device equipped with hardware or software capable of operating as a base station or a wireless access point, for example. The small cell 10C in this case is a dynamically formed local network (localized network/virtual cell).

The cell 10A may be operated according to an arbitrary wireless communication system such as LTE, LTE-Advanced (LTE-A), LTE-ADVANCED PRO, GSM (registered trademark), UMTS, W-CDMA, CDMA200, WiMAX, WiMAX2, or IEEE802.16, for example.

Note that the small cell is a concept that can include various types of cells (for example, a femto cell, a nano cell, a pico cell, a micro cell, and the like) that are smaller than the macro cell and are arranged overlapping or not overlapping with the macro cell. In one example, the small cell is operated by a dedicated base station. In another example, the small cell is operated by a terminal serving as a master device temporarily operating as a small cell base station. So-called relay nodes can also be considered as a form of small cell base station. A wireless communication device that functions as a master station of a relay node is also referred to as a donor base station. The donor base station may mean a DeNB in LTE or more generally a parent station of the relay node.

(2) Terminal Device 200

The terminal device 200 can communicate in a cellular system (or mobile communication system). The terminal device 200 performs wireless communication with a wireless communication device (for example, the base station 100A or the master device 100B or 100C) in the cellular system. For example, the terminal device 200A receives a downlink signal from the base station 100A and transmits an uplink signal to the base station 100A.

Furthermore, the terminal device 200 is not limited to only a so-called UE, and for example, a so-called low cost terminal (low cost UE) such as an MTC terminal, an enhanced MTC (eMTC) terminal, and an NB-IoT terminal may be applied.

(3) Supplement

The schematic configuration of the system 1 has been described, but the present technology is not limited to the example illustrated in FIG. 1. For example, as the configuration of the system 1, a configuration that does not include a master device, such as small cell enhancement (SCE), heterogeneous network (HetNet), or an MTC network, can be adopted. Furthermore, as another example of the configuration of the system 1, a master device may be connected to a small cell and construct a cell under the small cell.

An example of a schematic configuration of the system 1 according to the embodiment of the present disclosure has been described with reference to FIG. 1.

1.2. Configuration Example of Terminal Device

Figure 2:
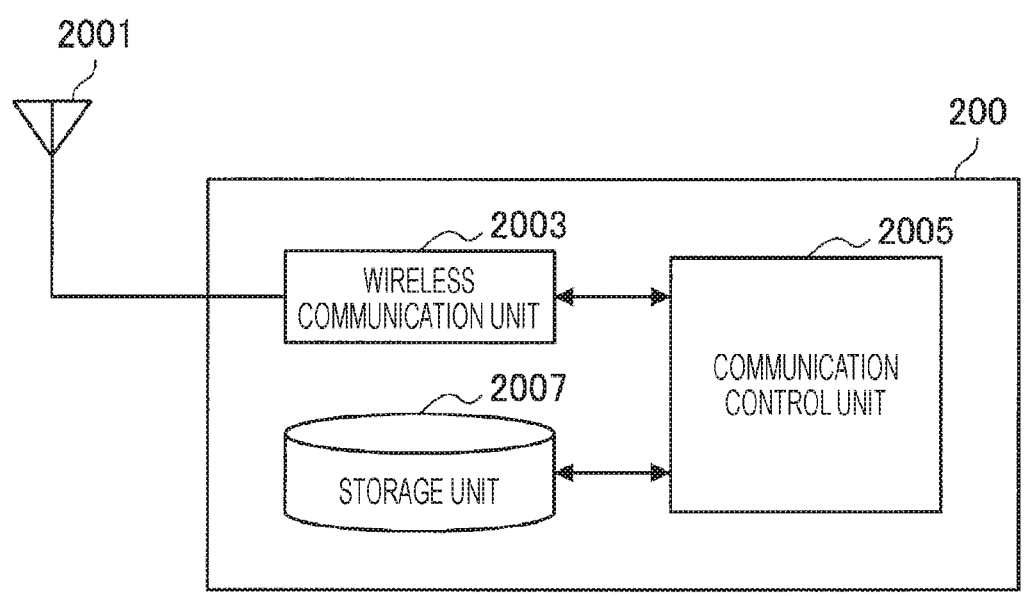
FIG. 2 is a block diagram illustrating an example of a configuration of a terminal device according to the embodiment.

Next, an example of a configuration of the terminal device 200 according to the embodiment of the present disclosure will be described with reference to FIG. 2. FIG. 2 is a block diagram illustrating an example of a configuration of the terminal device 200 according to the embodiment of the present disclosure. As illustrated in FIG. 2, the terminal device 200 includes an antenna unit 2001, a wireless communication unit 2003, a storage unit 2007, and a communication control unit 2005.

(1) Antenna Unit 2001

The antenna unit 2001 radiates a signal output from the wireless communication unit 2003 into a space as a radio wave. Furthermore, the antenna unit 2001 converts the radio wave in the space into a signal and outputs the signal to the wireless communication unit 220.

(2) Wireless Communication Unit 2003

The wireless communication unit 2003 transmits and receives a signal. For example, the wireless communication unit 2003 receives a downlink signal from the base station and transmits an uplink signal to the base station.

(3) Storage Unit 2007

The storage unit 2007 temporarily or permanently stores a program and various data for the operation of the terminal device 200.

(4) Communication Control Unit 2005

The communication control unit 2005 controls communication with another device (for example, the base station 100) by controlling the operation of the wireless communication unit 2003. As a specific example, the communication control unit 2005 may modulate data to be transmitted on the basis of a predetermined modulation method to generate a transmission signal, and may cause the wireless communication unit 2003 to transmit the transmission signal to the base station 100. Furthermore, as another example, the communication control unit 2005 may acquire, from the wireless communication unit 2003, a reception result (that is, a reception signal) of a signal from the base station 100, and may apply predetermined demodulation processing to the reception signal to demodulate data transmitted from the base station 100.

An example of the functional configuration of the terminal device 200 according to the embodiment of the present disclosure has been described with reference to FIG. 2.

2. STUDY ON COMMUNICATION USING MILLIMETER WAVE

In a communication system based on a standard such as LTE/LTE-A, a wireless signal having a frequency called ultra high frequency around 700 MHz to 3.5 GHz is used for communication. In contrast, in a fifth generation (5G) mobile communication system following LTE/LTE-A, use of communication using a wireless signal (hereinafter also simply referred to as "millimeter wave") having a frequency called millimeter wave such as 28 GHz or 39 GHz is being studied. Therefore, after describing an outline of communication using millimeter waves, technical problems of the communication device according to an embodiment of the present disclosure will be organized.

In the communication using ultra-high frequencies like LTE/LTE-A, a so-called multiple-input and multiple-output (MIMO) technology is adopted, thereby further improving communication performance using reflected waves in addition to direct waves in signal transmission/reception even under a fading environment.

In contrast, the millimeter wave can increase the amount of information to be transmitted as compared with the ultra high frequency wave, but the millimeter wave has high straightness and tends to increase propagation loss and reflection loss. Therefore, in an environment (so-called a line of site (LOS)) where there are no obstacles on a path directly connecting antennas that transmit and receive wireless signals, the direct waves mainly contribute to communication characteristics without being hardly affected by reflected waves. From such characteristics, in the communication using millimeter waves, for example, a communication terminal such as a smartphone receives a wireless signal (that is, a millimeter wave) directly transmitted from a base station (that is, receives the direct wave), thereby further improving the communication performance.

Furthermore, as described above, in the communication using millimeter waves, the direct waves mainly contribute to the communication characteristics and the influence of the reflected waves is small. From such characteristics, in the communication using millimeter waves between a communication terminal and a base station, introduction of the technology called polarization MIMO, which implements MIMO using a plurality of polarized waves (for example, a horizontal polarized wave and a vertical polarized wave) with different polarization directions from one another, of a wireless signal transmitted as a direct wave, is being discussed. Note that, in the present disclosure, the "polarization direction" corresponds to a direction in which a wireless signal (that is, a polarized wave) vibrates. That is, a so-called "polarization plane" is defined by the direction in which the wireless signal propagates and the polarization direction of the wireless signal. Furthermore, a polarized wave having the polarization plane vertical to the ground corresponds to a "vertical polarized wave", and a polarized wave having the polarization plane horizontal to the ground corresponds to a "horizontal polarized wave".

However, a terminal device configured to be portable such as a mobile communication terminal such as a smartphone changes in position and posture from moment to moment with movement of a user who carries the terminal device or change in a mode to hold the terminal device. In such a situation, the relative positional relationship between the terminal device and the base station also changes from time to time, so that a direction in which a direct wave from the base station arrives at the terminal device also changes. This is similarly applies to a case where the communication device itself is configured to be movable.

Furthermore, as described above, the millimeter wave has larger reflection loss than the ultra high frequency wave, and particularly tends to be easily reflected by a human body. Therefore, for example, if a communication path directly connecting an antenna element provided in the terminal device and the base station is blocked by a part such as a hand holding a housing of the terminal device, the millimeter waves propagating through the communication path are blocked by the hand or the like. That is, the position in the terminal device that can transmit or receive the millimeter waves in the communication with the base station (that is, a position not blocked by the hand or the like) also changes in accordance with the position of the terminal device held by the part such as the hand.

From such a situation, even under the situation where the position and posture changes from moment to moment, a communication device capable of implementing the polarization MIMO using direct waves in a more favorable mode is demanded in communication with another device via a wireless communication path.

Meanwhile, in recent years, communication devices such as smartphones have become thinner, and a mount space for antennas for wireless communication tends to be limited. From such a background, the space in the thickness direction of the thin communication device, in which an antenna can be mounted, is limited particularly on an end side of the communication device. For this reason, it is difficult to provide an antenna for transmitting or receiving a polarized wave having a polarization direction substantially coinciding with the thickness direction of the communication device at an end of the communication device.

In view of the foregoing, in the present disclosure, an example of a technology of enabling even a thin communication device to transmit or receive a polarized wave having a polarization direction substantially coinciding with a thickness direction of the communication device will be described.

3. TECHNICAL CHARACTERISTICS

Hereinafter, technical characteristics of the communication device according to an embodiment of the present disclosure will be described.

3.1. Comparative Example

Figure 3:
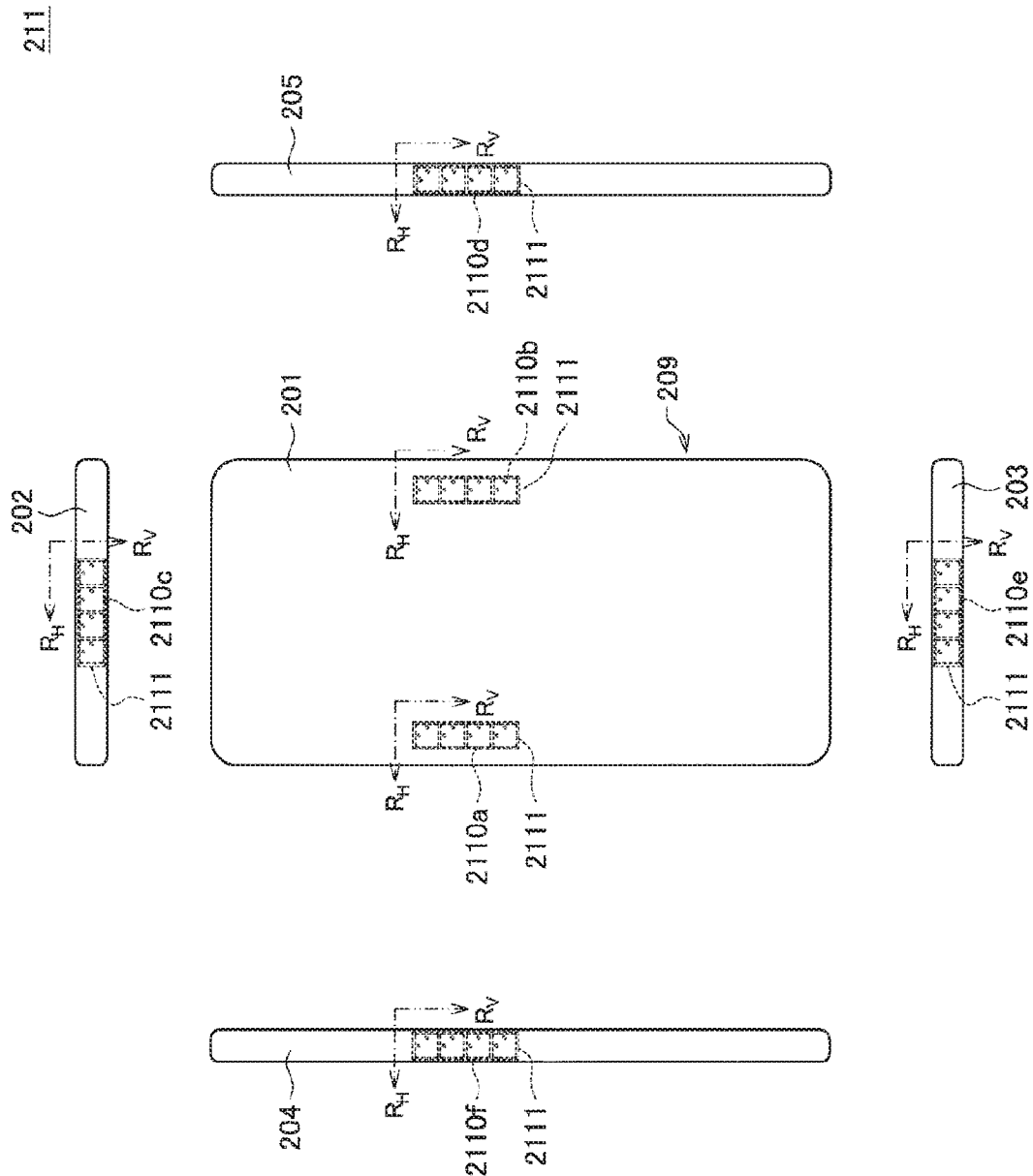
FIG. 3 is an explanatory view for describing an example of a configuration of a communication device according to a comparative example.

First, to more easily understand the characteristics of the communication device according to the present embodiment, an example of a configuration of case where a so-called patch array antenna having arrayed patch antennas (planar antennas) is applied to a communication device such as the above-described terminal device 200 will be described as a comparative example. For example, FIG. 3 is an explanatory view for describing an example of a configuration of a communication device according to the comparative example. Note that, in the following description, the communication device according to the comparative example in FIG. 3 may be referred to as a "communication device 211".

The communication device 211 according to the comparative example includes a plate-like housing 209 having a front surface and a back surface having a substantially rectangular shape. Note that, in the present description, a surface on a side provided with a display unit such as a display is referred to as a front surface of the housing 209. That is, in FIG. 3, the reference numeral 201 denotes the back surface of outer surfaces of the housing 209. Furthermore, the reference numerals 203 and 205 each correspond to one end surface located in a periphery of the back surface 201 of the outer surfaces of the housing 209, and more specifically denote end surfaces extending in a longitudinal direction of the back surface 201. Furthermore, the reference numerals 202 and 204 each correspond to one end surface located in the periphery of the back surface 201 of the outer surfaces of the housing 209, and more specifically denote end surfaces extending in a short direction of the back surface 201. Note that the front surface located on the opposite side of the back surface 201 is also referred to as "front surface 206" for convenience although illustration is omitted in FIG. 3.

Furthermore, in FIG. 3, the reference numerals 2110a to 2110f denote antenna devices for transmitting and receiving wireless signals (for example, millimeter waves) to and from the base station. Note that, in the following description, the antenna devices 2110a to 2110f may be simply referred to as "antenna device(s) 2110" unless otherwise distinguished.

As illustrated in FIG. 3, the communication device 211 according to the comparative example includes the antenna device 2110 inside the housing 209 to be located in the vicinity of at least a part of each of the back surface 201 and the end surfaces 202 to 205.

Furthermore, the antenna device 2110 includes a plurality of antenna elements 2111. More specifically, the antenna device 2110 is configured as an array antenna by arraying the plurality of antenna elements 2111. For example, an antenna element 2111a is held to be located near an end of the back surface 201 on the end surface 204 side, and has a plurality of antenna elements 2111 provided to be arrayed along a direction in which the end extends (that is, the longitudinal direction of the end surface 204). Furthermore, an antenna element 2111d is held to be located near a part of the end surface 205, and has a plurality of antenna elements 2111 provided to be arrayed along the longitudinal direction of the end surface 205.

Furthermore, in the antenna device 2110 held to be located near a certain surface, each antenna element 2111 is held such that a normal direction of a planar element substantially coincides with a normal direction of the planar surface. In a case of focusing on the antenna device 2110a as a more specific example, the antenna element 2111 provided in the antenna device 2110a is held such that the normal direction of the planar element substantially coincides with the normal direction of the back surface 201. This similarly applies to the other antenna devices 2110b to 2110f.

With the above configuration, each antenna device 2110 controls phases and power of wireless signals transmitted or received by the plurality of antenna elements 2111, thereby controlling (that is, performing beam forming for) directivities of the wireless signals.

Figure 4:
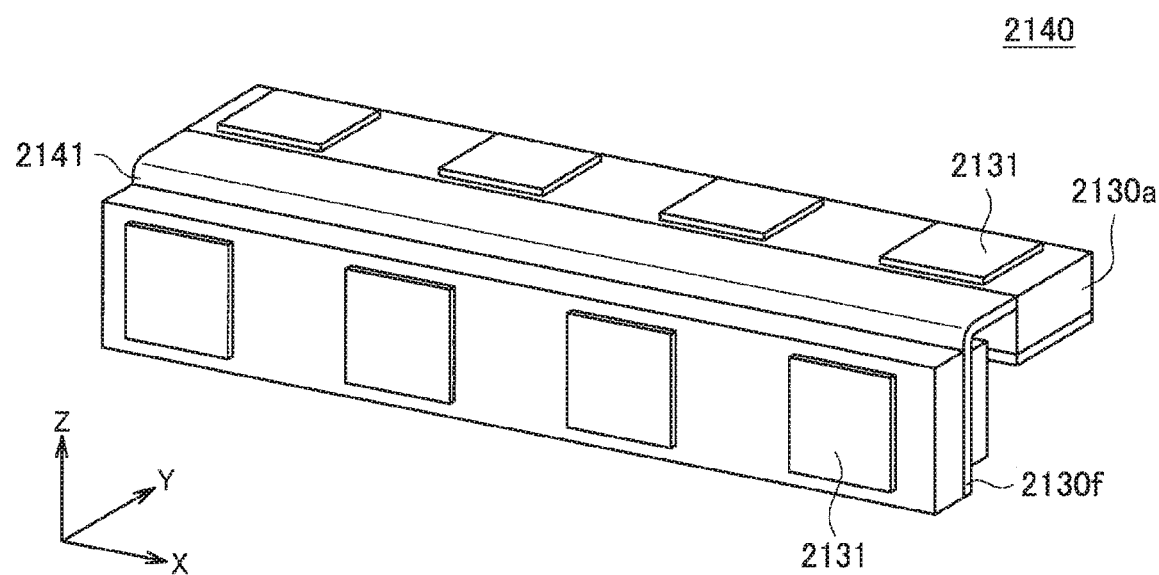
FIG. 4 is an explanatory view for describing an example of a schematic configuration of an antenna device according to a comparative example.

Next, an example of a schematic configuration of an antenna device to be applied to the communication device 211 according to the comparative example will be described with reference to FIG. 4. FIG. 4 is an explanatory view for describing an example of a schematic configuration of an antenna device according to the comparative example.

An antenna device 2140 illustrated in FIG. 4 is configured by coupling two mutually different antenna devices 2130 via a coupling unit 2141. Note that antenna devices 2130a and 2130f in the example in FIG. 4 respectively correspond to, for example, the antenna devices 2110a and 2110f in the example illustrated in FIG. 3. That is, an antenna element denoted by reference numeral 2131 in FIG. 4 corresponds to the antenna element 2111 illustrated in FIG. 3. Note that, in the example illustrated in FIG. 4, a direction in which a plurality of the antenna elements 2131 is arrayed may be referred to as an x direction, and a thickness direction of the antenna device 2140 may be referred to as a z direction, for convenience. Furthermore, a direction orthogonal to both the x direction and the z direction may be referred to as a y direction.

As illustrated in FIG. 4, the antenna device 2130a and the antenna device 2130f are arranged such that one ends extending in the array direction of the plurality of antenna elements 2131, of respective ends, are located close to each other. At this time, the antenna element 2131 of the antenna device 2130a and the antenna element 2131 of the antenna device 2130f are arranged such that the normal directions of planar elements intersect with (for example, orthogonal to) each other, or the normal directions are twisted relative to each other. Furthermore, the coupling unit 2141 is provided between the antenna device 2130a and the antenna device 2130f to bridge the ends located close to each other, so that the antenna device 2130a and the antenna device 2130f are coupled by the coupling unit 2141.

The antenna device 2140 having the above configuration is favorably held along a plurality of surfaces (outer surfaces) connected to each other, of the outer surfaces of the housing 209, such as the back surface 201 and the end surface 204 illustrated in FIG. 3, for example. With such a configuration, for each of the plurality of surfaces connected to each other, each of a plurality of polarized waves coming from a direction substantially perpendicular to the surface and having different polarization directions from each other can be transmitted or received in a more favorable mode.

An example of the schematic configuration of the antenna device to be applied to the communication device 211 according to the comparative example has been described with reference to FIG. 4.

Meanwhile, further reduction in the thickness of an antenna device to be mounted on a communication terminal such as a smartphone has been demanded with the recent reduction of the communication terminal. Therefore, the present embodiment proposes an example of a configuration of an antenna device that can be formed thinner than the antenna device 2140 according to the comparative example described with reference to FIG. 4 and can transmit or receive a polarized wave having a polarization direction substantially coinciding with the thickness direction (that is, the z direction in FIG. 4).

3.2. Schematic Configuration

Figure 5:
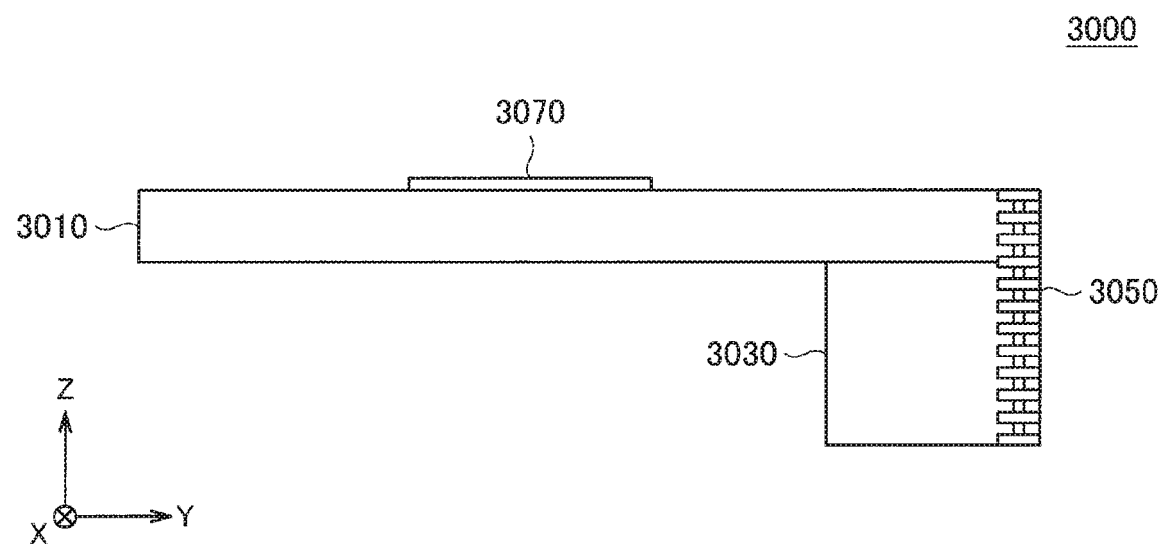
FIG. 5 is an explanatory view for describing a schematic configuration of an antenna device according to the embodiment.

First, an example of a schematic configuration of the antenna device according to the present embodiment will be described with reference to FIG. 5. FIG. 5 is an explanatory diagram for describing an example of a schematic configuration of the antenna device according to the present embodiment, and is a schematic side view of the antenna device according to the present embodiment. That is, FIG. 5 illustrates an example of a configuration of the antenna device according to the present embodiment in a case where the antenna device is viewed from the x direction in the example illustrated in FIG. 4. Note that x, y, and z directions in the example illustrated in FIG. 5 correspond to the x, y, and z directions in the example illustrated in FIG. 4. Furthermore, in the present description, an up direction in FIG. 5 is +z direction and a down direction is −z direction, for convenience. Furthermore, a right direction in FIG. 5 is +y direction and a left direction is −y direction. Furthermore, a direction from a front side to a depth side in FIG. 5 is +x direction and a direction from the depth side to the front side is −x direction. Furthermore, in the following description, the antenna device illustrated in FIG. 5 is also referred to as an "antenna device 3000" for convenience. Note that the x direction, the z direction, and the y direction respectively correspond to examples of a "first direction", a "second direction", and a "third direction".

As illustrated in FIG. 5, the antenna device 3000 includes a first substrate 3010, a second substrate 3030, an antenna element 3050, and an antenna element 3070. The first substrate 3010 has a surface having a normal direction substantially coinciding with the z direction and extending in the x direction and the y direction. The first substrate 3010 is formed as, for example, a substrate with the thickness in the z direction of about 1 mm.

The antenna element 3070 is supported on a front surface (a surface on the +z direction side) of the first substrate 3010. The antenna element 3070 is configured to be able to transmit or receive a wireless signal having a propagation direction substantially coinciding with the z direction. For example, the antenna element 3070 corresponds to the antenna element 2131 provided in the antenna device 2130a in the example in FIG. 4 and can be configured as a patch antenna similarly to the antenna element 2131.

Furthermore, the second substrate 3030 is supported on a back surface (a surface on a −z direction side) of the first substrate 3010 to extend in the −z direction at an end side in the +y direction. Furthermore, the second substrate 3030 is formed to extend in the x direction, similarly to the first substrate 3010. That is, the second substrate 3030 has a surface having a normal direction substantially coinciding with the y direction and extending in the z direction and the x direction. At this time, the thickness in the z direction of a portion of the antenna device 3000, the portion supporting the second substrate 3030, (that is, the thickness from an end in the −z direction of the second substrate 3030 to a top surface of the first substrate 3010) is formed to be about 3 to 4 mm.

The antenna element 3050 is supported on a front surface (a surface on the +y direction side) of the second substrate 3030. In the antenna device 3000 according to the present embodiment, the antenna element 3050 is configured to be able to transmit or receive a polarized wave having the propagation direction substantially coinciding with the y direction and at least a polarization direction substantially coinciding with the thickness direction (that is, the z direction) of the antenna device 3000. As a specific example, the antenna element 3050 may be configured as a patch antenna. Furthermore, as another example, the antenna element 3050 may be configured as a dipole antenna having an element extending in the z direction. Note that details of an example of the configuration of the antenna element 3050 will be separately described below.

An example of the schematic configuration of the antenna device according to the present embodiment has been described with reference to FIG. 5.

3.3. Configuration Example of Antenna Device

Next, an example of a more detailed configuration of the antenna device according to the embodiment of the present disclosure will be described below.

3.3.1. First Configuration Example

First, as a first configuration example, an example of a configuration of the antenna device according to the present embodiment in a case where a patch antenna is applied as the antenna element 3050 illustrated in FIG. 5 will be described. For example, FIGS. 6 to 9 are explanatory views for describing a first configuration example of the antenna device according to the present embodiment. Note that, in the following description, the antenna device to be described as the first configuration example may be referred to as an "antenna device 3100" to be distinguished from antenna devices according to other configuration examples.

Figure 6:
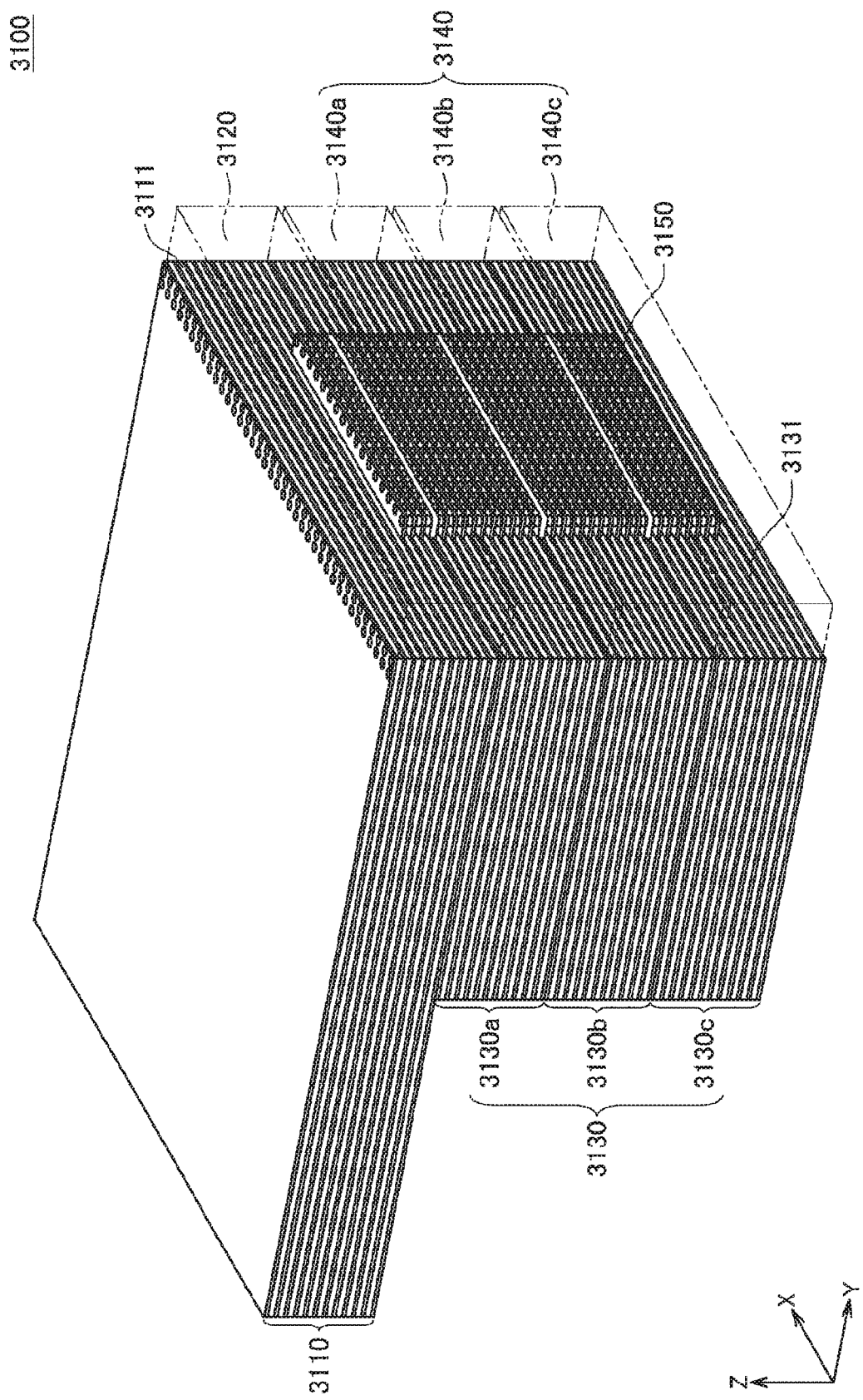
FIG. 6 is an explanatory view for describing a first configuration example of the antenna device according to the embodiment.

First, an example of a schematic configuration of the antenna device 3100 will be described with reference to FIGS. 6 and 7. FIG. 6 is a schematic perspective view of the antenna device 3100. Note that FIG. 6 focuses a configuration of a portion to which the patch antenna is applied as the antenna element 3050 illustrated in FIG. 5, and illustration of a configuration corresponding to the antenna element 3070 illustrated in FIG. 5 is omitted. Furthermore, x, y, and z directions in FIG. 6 correspond to the x, y, and z directions in FIG. 5.

As illustrated in FIG. 6, the antenna device 3100 includes a first substrate 3110, a second substrate 3130, an antenna element 3150, and dielectrics 3120 and 3140. Furthermore, FIG. 7 is a schematic perspective view of the antenna device 3100, and corresponds to a view obtained by omitting illustration of dielectrics 3120 and 3140 in the example illustrated in FIG. 6, for easily understanding of the configuration of the antenna element 3150.

The first substrate 3110 corresponds to first substrate 3010 in the example illustrated in FIG. 5. That is, the first substrate 3110 has a surface having a normal direction substantially coinciding with the z direction and extending in the x direction and the y direction. The first substrate 3110 may be formed by, for example, stacking a plurality of wiring layers in the z direction.

The second substrate 3130 corresponds to the second substrate 3030 in the example illustrated in FIG. 5. That is, the second substrate 3130 is instructed on the first substrate 3110 to extend in the −z direction at an end side in the +y direction of a back surface (a surface on the −z direction side) of the first substrate 3110. For example, in the example illustrated in FIGS. 6 and 7, the second substrate 3130 may be formed by stacking a plurality of substrates 3130a to 3130c on the back surface side of the first substrate 3110 in the −z direction At this time, the method is not particularly limited as long as the plurality of substrates 3130a to 3130c can be stacked. As a specific example, the plurality of substrates 3130a to 3130c may be stacked in the z direction by bonding the substrates that are adjacent to each other in the z direction among the plurality of substrates 3130a to 3130c by soldering. Furthermore, the second substrate 3130 (that is, the substrates 3130a to 3130c) may be formed by stacking a plurality of wiring layers in the z direction. With the above-described configuration, the second substrate 3130 is formed to have a surface 3131 having a normal direction substantially coinciding with the y direction and extending in the z direction and the x direction.

Figure 7:
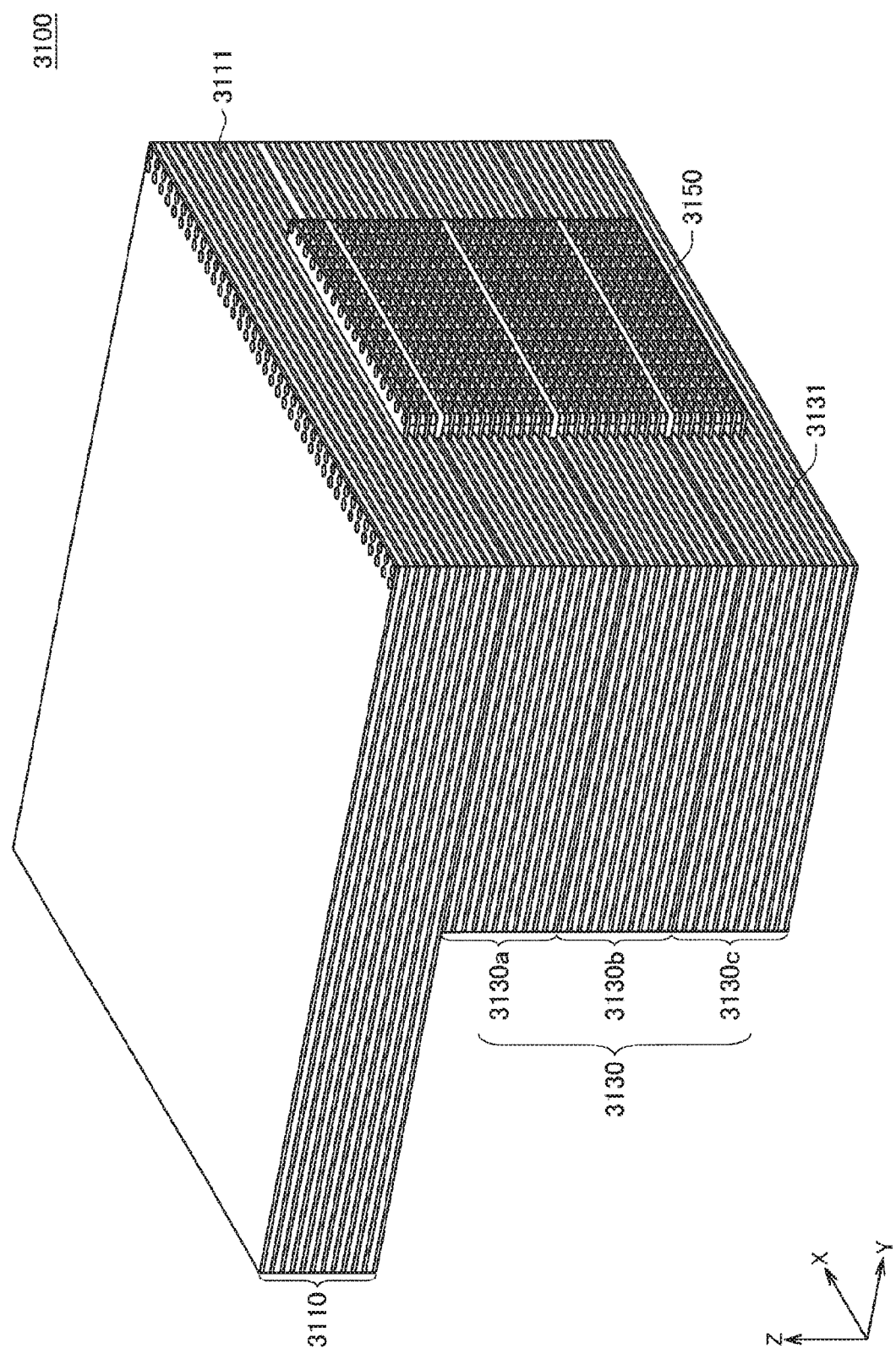
FIG. 7 is an explanatory view for describing the first configuration example of the antenna device according to the embodiment.

As illustrated in FIG. 7, the antenna element 3150 is held on the surface 3131 of the second substrate 3130. The antenna element 3150 is configured as a patch antenna having a substantially flat element formed to extend in both the x direction and the z direction.

As illustrated in FIG. 6, the dielectrics 3120 and 3140 are formed in a region where antenna element 3150 is held to include the antenna element 3150. At this time, a part of the antenna element 3150 may be exposed on end surfaces on the +y direction side of the dielectrics 3120 and 3140. Note that the dielectric 3120 corresponds to the dielectric having the thickness in the y direction and formed on an end 3111 on the +y direction side of the first substrate 3110. Furthermore, the dielectric 3140 corresponds to the dielectric having the thickness in the y direction and formed on the surface 3131 on the +y direction side of the second substrate 3130. Note that, in the example illustrated in FIG. 6, the second substrate 3130 is formed by stacking the substrates 3130a and 3130b in the z direction. Therefore, the dielectric 3140 may be formed by stacking the dielectrics 3140a to 3140c formed on end sides in the +y direction of the substrates 3130a to 3130b in the z direction.

Figure 8:
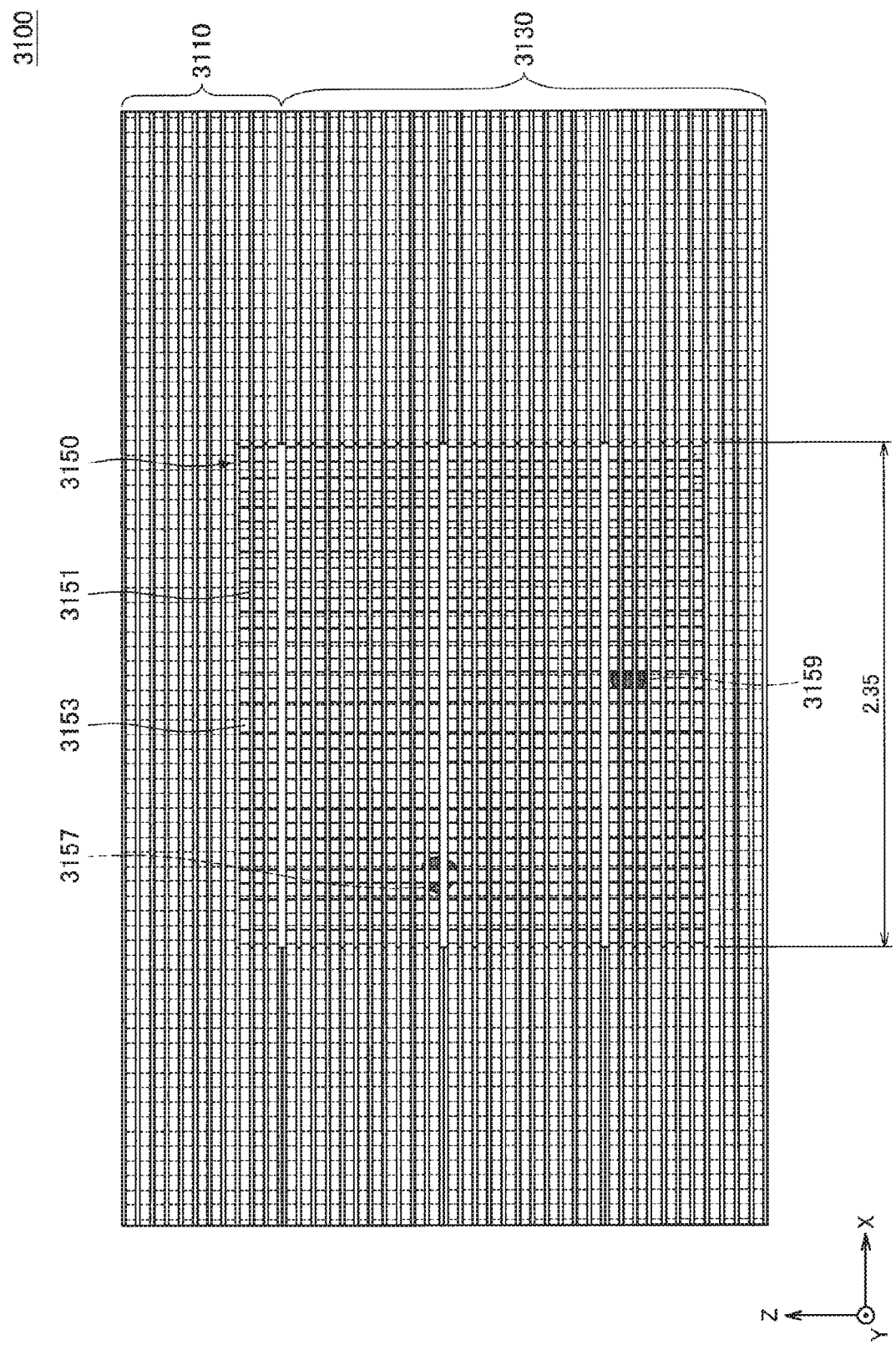
FIG. 8 is an explanatory view for describing the first configuration example of the antenna device according to the embodiment.
Figure 9:
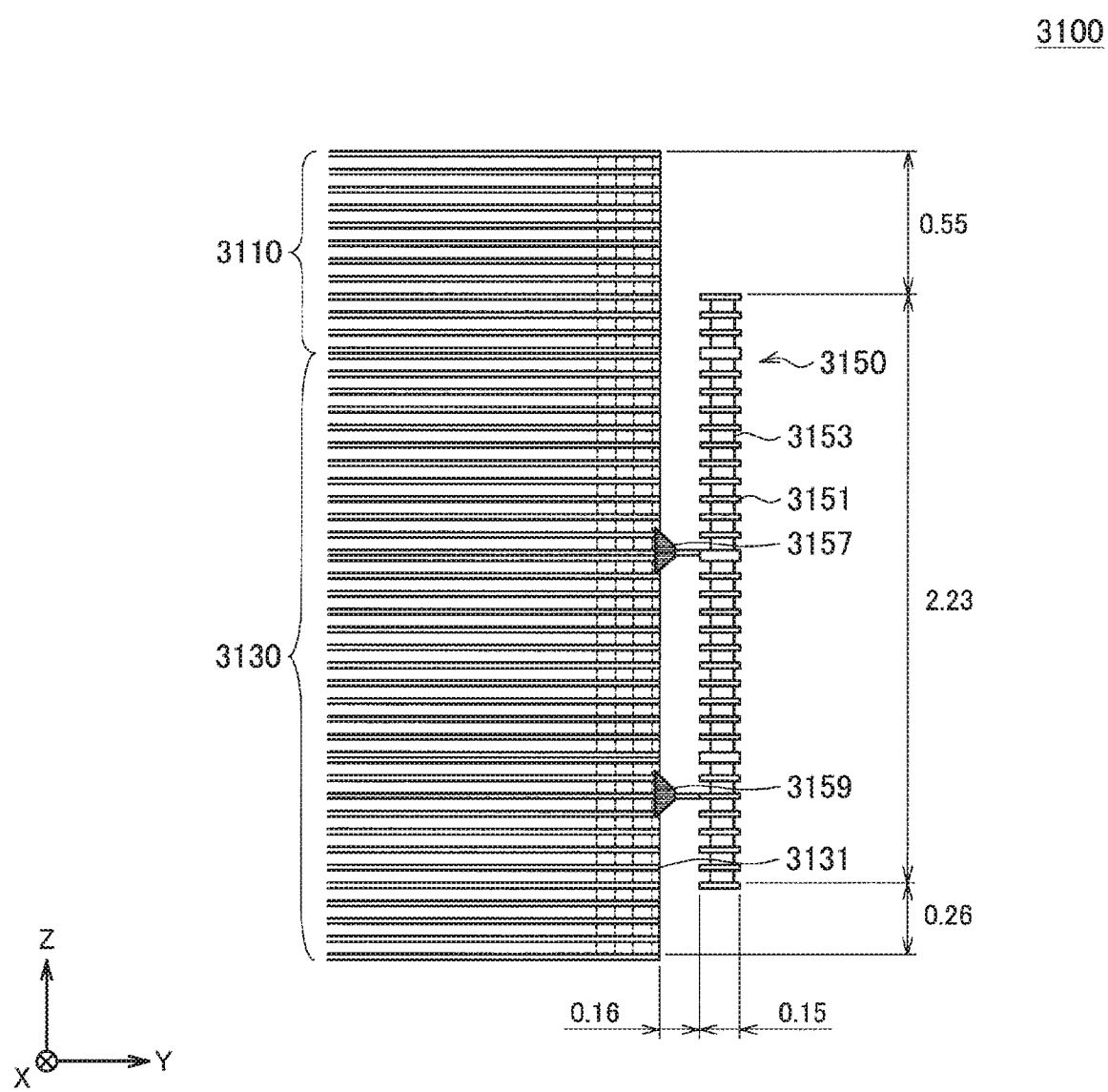
FIG. 9 is an explanatory view for describing the first configuration example of the antenna device according to the embodiment.

Here, an example of a more detailed configuration of the antenna element 3150 will be described with reference to FIGS. 8 and 9. FIG. 8 is a diagram illustrating an example of a configuration of the antenna device 3100 in a case where the antenna device 3100 illustrated in FIG. 7 is viewed from the y direction. Furthermore, FIG. 9 is a diagram illustrating an example of a configuration of the antenna device 3100 in a case where the antenna device 3100 illustrated in FIG. 7 is viewed from the x direction.

As illustrated in FIG. 8, the antenna element 3150 includes a plurality of elements 3151 formed in a long shape to extend in the x direction, and a plurality of elements 3153 formed in a long shape to extend in the z direction. Each of the elements 3151 and 3153 is formed using a conductive material such as a metal. Furthermore, the plurality of elements 3153 is formed to electrically connect the plurality of elements 3151, respectively.

Furthermore, the antenna element 3150 includes feeding points 3157 and 3159. As illustrated in FIG. 8, the feeding point 3157 is provided on an end side in the x direction of the antenna element 3150. Furthermore, the feeding point 3159 is provided on an end side in the z direction of the antenna element 3150. As illustrated in FIG. 9, the antenna element 3150 is electrically connected to the surface 3131 of the second substrate 3130 at the feeding points 3157 and 3159. That is, a current supplied through wiring provided in the second substrate 3130 is supplied to the antenna element 3150 through each of the feeding points 3157 and 3159. When the current is supplied to the antenna element 3150 via the feeding point 3157, for example, on the basis of such a configuration, the current flows in the x direction through the element of the antenna element 3150 (that is, the current flows through the element 3151), and a polarized wave having the propagation direction substantially coinciding with the y direction and the polarization direction substantially coinciding with the x direction becomes able to be transmitted or received. Similarly, when the current is supplied to the antenna element 3150 via the feeding point 3159, the current flows in the z direction through the element of the antenna element 3150 (that is, the current flows through the element 3153), and a polarized wave having the propagation direction substantially coinciding with the y direction and the polarization direction substantially coinciding with the z direction becomes able to be transmitted or received. Note that, in the following description, the polarized wave having the propagation direction substantially coinciding with the y direction and the polarization direction substantially coinciding with the x direction is also referred to as a "polarized wave $R_H$" and the polarized wave having the propagation direction substantially coinciding with the y direction and the polarization direction substantially coinciding with the z direction is also referred to as a "polarized wave $R_V$".

Note that the antenna element 3150 can be formed by, for example, cutting out from the second substrate 3130 by etching or the like. Specifically, a plurality of wiring layers forming the second substrate 3130 is electrically connected to one another by forming vias in the z-direction. Note that, at this time, the via corresponds to the element 3153 illustrated in FIG. 8, and a part of the wiring layer corresponds to the element 3151 illustrated in FIG. 8. Thereafter, the antenna element 3150 is simply formed by etching or the like such that a portion where the via (element 3153) is formed is exposed in the y direction. With such a configuration, the antenna element 3150 has a configuration in which the elements 3151 are stacked in the thickness direction. Of course, the method for forming the above-described antenna element 3150 is only an example. That is, the method is not particularly limited as long as the antenna element 3150 can be formed as a patch antenna having a substantially flat element extending in the x direction and the z direction.

Note that the dimension of the antenna element 3150 is determined according to the frequency of the wireless signal to be transmitted or received. For example, the example illustrated in FIGS. 8 and 9 assume a case where a 28-GHz band (for example, 26.5 GHz to 29.5 GHz) wireless signal is transmitted or received as the polarized wave $R_H$ and the polarized wave $R_V$. That is, in the example illustrated in FIGS. 8 and 9, the substantially flat element of the antenna element 3150 is formed to have the width of 2.35 mm in the x direction and the width of 2.23 mm in the z direction. Furthermore, the element of antenna element 3150 is formed to have the thickness of 0.15 mm in the y direction and to be separated from surface 3131 of the second substrate 3130 by 0.16 mm in the y direction. Furthermore, an end on the +z direction side of the element of the antenna element 3150 and a position corresponding to the surface (that is, the surface on the +z direction side) of the first substrate 3110 has a width of 0.55 mm in the z direction. Furthermore, an end on the −z direction side of the element of the antenna element 3150 and a position corresponding to an end on the −z direction side of the second substrate 3130 has a width of 0.26 mm in the z direction.

Figure 10:
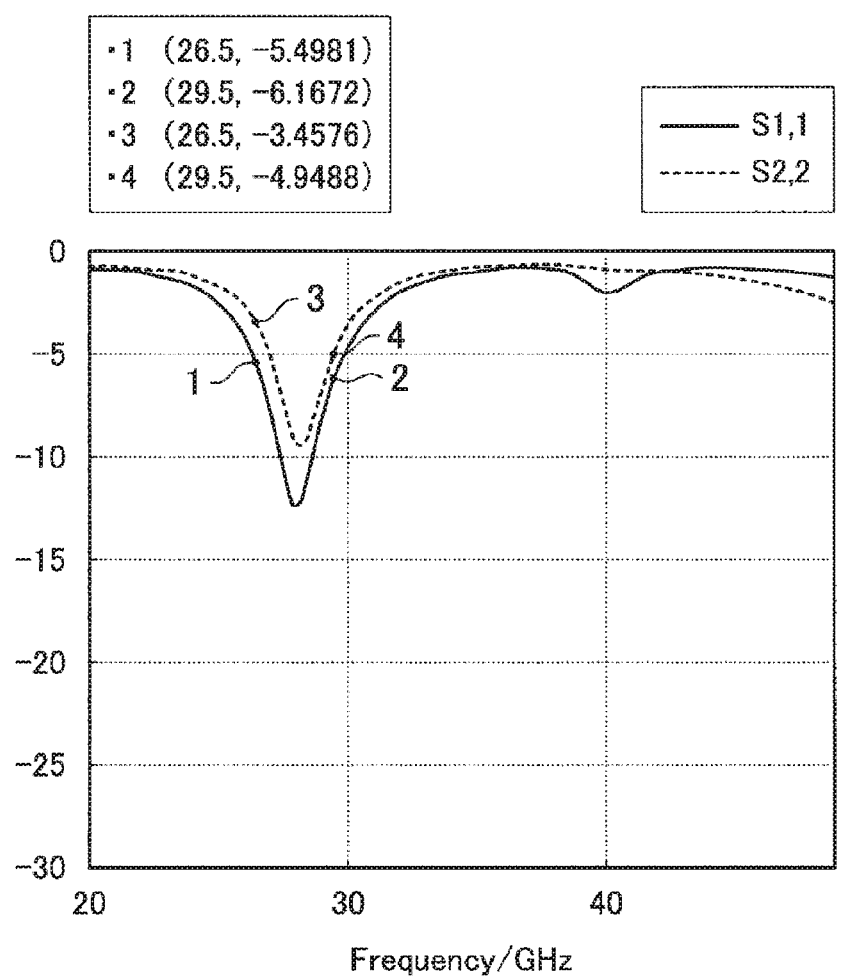
FIG. 10 is a graph illustrating an example of simulation results of antenna characteristics of the antenna device according to the first configuration example of the embodiment.

Here, an example of antenna characteristics of the antenna device 3100 according to the present configuration example will be described with reference to FIG. 10. FIG. 10 is a graph illustrating an example of simulation results of antenna characteristics of the antenna device according to the first configuration example of the present embodiment. In FIG. 10, the horizontal axis represents a frequency, and the vertical axis represents a gain. Furthermore, in FIG. 10, the simulation results illustrated with "S1, 1" indicate the antenna characteristics regarding transmission or reception of the polarized wave $R_H$, and the simulation results illustrated with "S2, 2" indicate the antenna characteristics regarding transmission or reception of the polarized wave $R_V$. As illustrated in FIG. 10, the antenna device 3100 can secure a return loss of about 6 dB for the polarized wave $R_H$ and a return loss of about 4 dB for the polarized wave $R_V$ in the band of 26.5 GHz to 29.5 GHz.

An example of the configuration of the antenna device according to the present embodiment in the case where a patch antenna is applied as the antenna element 3050 illustrated in FIG. 5 has been described as the first configuration example with reference to FIGS. 6 to 10.

3.3.2. Second Configuration Example

Next, as a second configuration example, an example of a configuration of the antenna device according to the present embodiment in a case where the antenna elements 3150 according to the first configuration example are arrayed will be described. Note that, in the following description, the antenna device to be described as the second configuration example may be referred to as an "antenna device 3200" to be distinguished from antenna devices according to other configuration examples.

Figure 11:
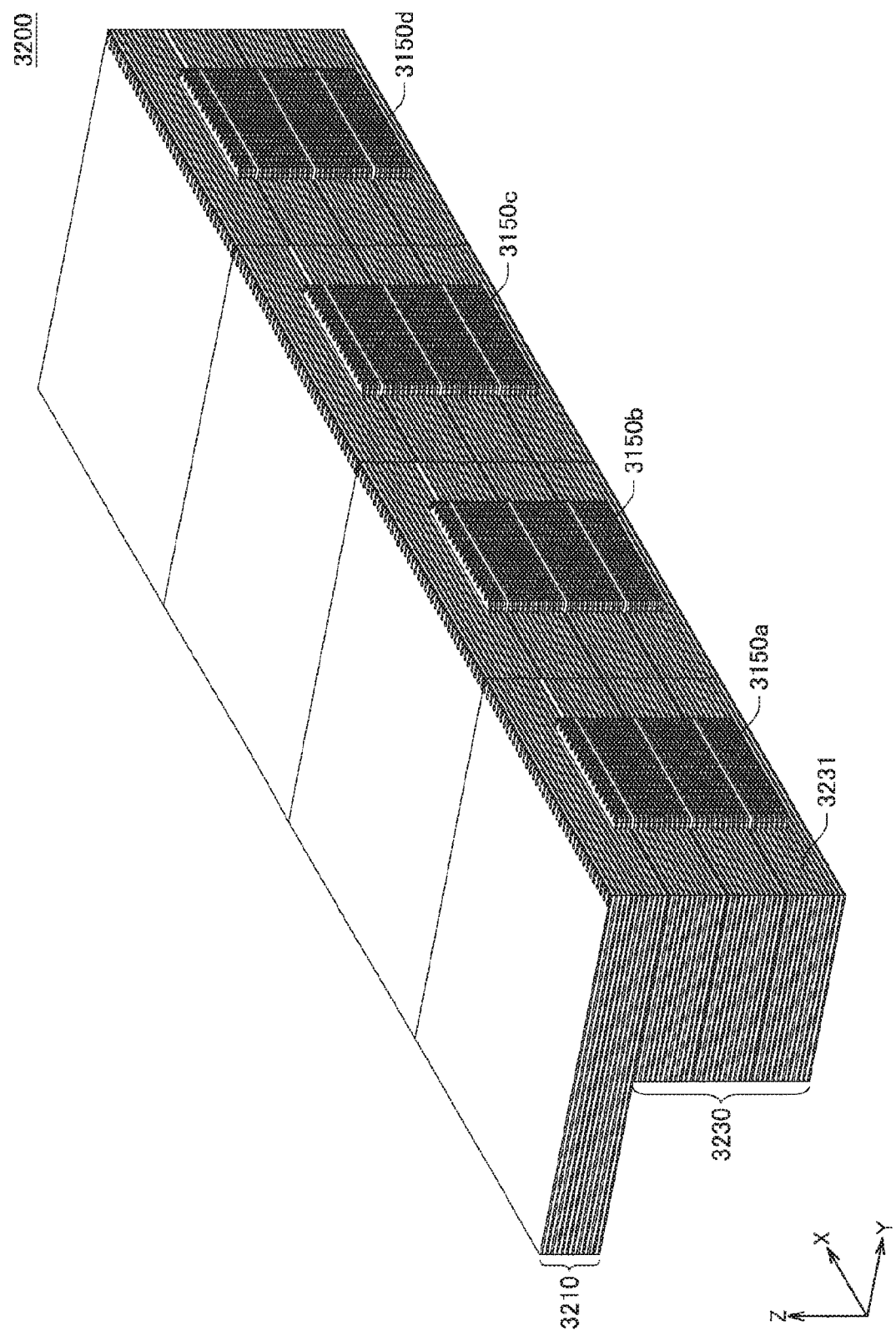
FIG. 11 is an explanatory view for describing a second configuration example of the antenna device according to the embodiment.

For example, FIG. 11 is an explanatory view for describing the second configuration example of the antenna device according to the present embodiment, and illustrates a schematic perspective view of the antenna device according to the present configuration example. Note that x, y, and z directions in FIG. 11 correspond to the x, y, and z directions in FIGS. 6 to 9. Furthermore, in the example illustrated in FIG. 11, illustration of dielectrics (for example, the dielectrics 3120 and 3140 illustrated in FIG. 6) is omitted for easy understanding of the configuration of the antenna element.

As illustrated in FIG. 11, the antenna device 3200 includes a first substrate 3210, a second substrate 3230, and antenna elements 3150*a* to 3150*d*. The first substrate 3210 and second substrate 3230 respectively correspond to the first substrate 3110 and the second substrate 3130 of the antenna device 3100 illustrated in FIG. 6. Furthermore, each of the antenna elements 3150*a* to 3150*d* corresponds to the antenna element 3150 in the antenna device 3100.

That is, in the antenna device 3200, the second substrate 3230 is formed to extend in the x direction, and the plurality of antenna elements 3150 is supported on the second substrate 3230 to be arranged along the x direction. Furthermore, at this time, the plurality of antenna elements 3150 is supported on the second substrate 3230 to be separated from one another in the x direction.

With such a configuration, for example, beamforming can be implemented. Here, beamforming is a technology of enabling improvement of an antenna gain when transmitting or receiving a wireless signal propagating in a direction in which directivity of the antenna device is directed by controlling the directivity and narrowing the beam width. Specifically, in beamforming, for example, control is performed to optimize radio wave sensitivity at a specific point by controlling phase and power of a wireless signal transmitted or received by each of a plurality of antennas (for example, antenna elements). Such control can further improve the antenna gain in a case of transmitting or receiving a wireless signal in the direction in which the directivity of the antenna device is directed. That is, in the case of the antenna device 3200 illustrated in FIG. 11, control is performed (that is, the directivity is controlled) to optimize radio wave sensitivity at a specific point by controlling phase and power of a wireless signal transmitted or received by each of the plurality of antenna elements 3150 (for example, the antenna elements 3150*a* to 3150*d*).

An example of the configuration of the antenna device according to the present embodiment in the case where the antenna elements 3150 according to the first configuration example are arrayed has been described as the second configuration example with reference to FIG. 11.

3.3.3. Third Configuration Example

Next, as a third configuration example, an example of a configuration of the antenna device according to the present embodiment in a case where a dipole antenna is applied as the antenna element 3050 illustrated in FIG. 5 will be described. For example, FIGS. 12 to 15 are explanatory views for describing a third configuration example of the antenna device according to the present embodiment. Note that, in the following description, the antenna device to be described as the third configuration example may be referred to as an "antenna device 3300" to be distinguished from antenna devices according to other configuration examples.

Figure 12:
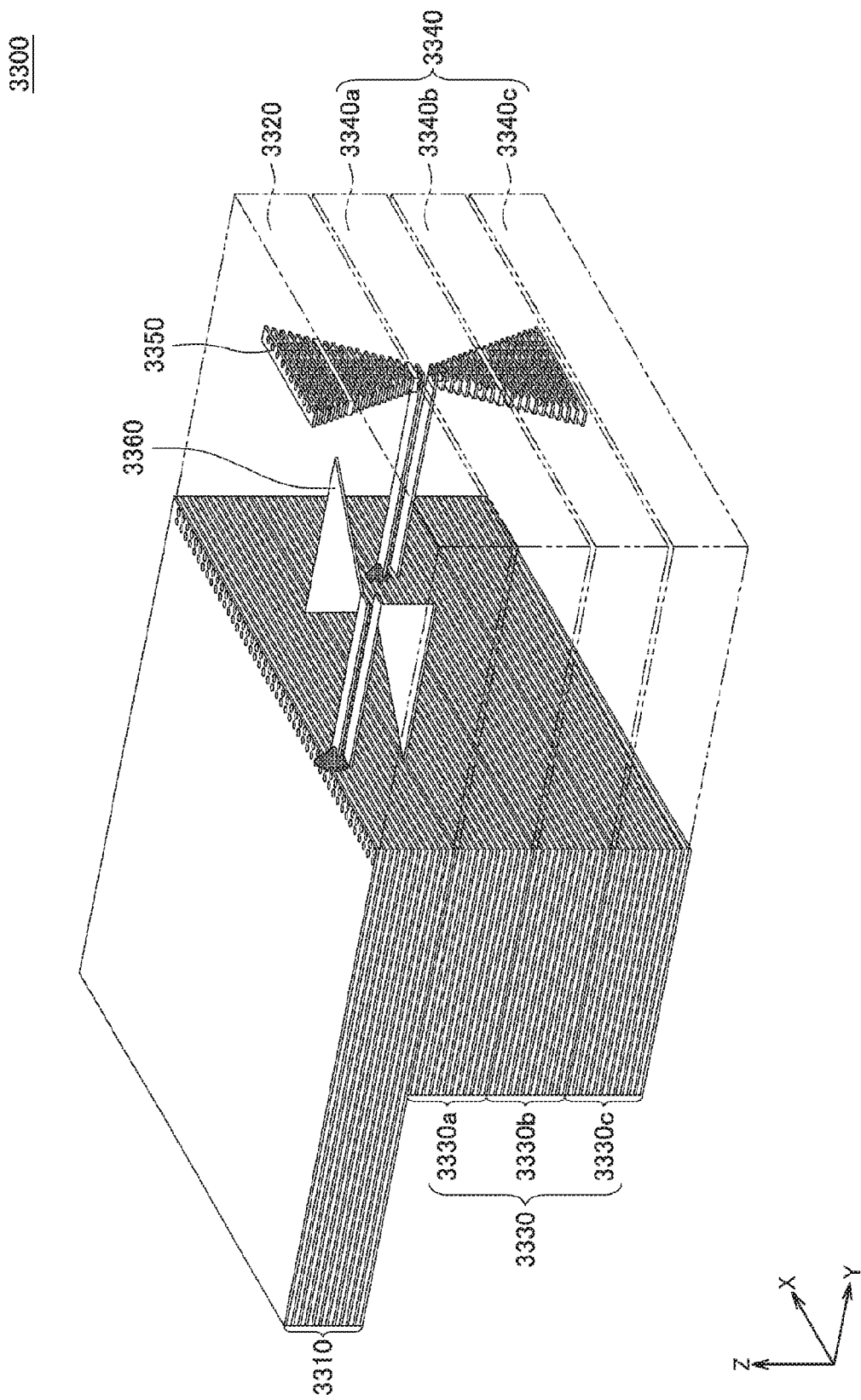
FIG. 12 is an explanatory view for describing a third configuration example of the antenna device according to the embodiment.

First, an example of a schematic configuration of the antenna device 3300 will be described with reference to FIGS. 12 and 13. FIG. 12 is a schematic perspective view of the antenna device 3300. Note that FIG. 12 focuses a configuration of a portion to which a dipole antenna is applied as the antenna element 3050 illustrated in FIG. 5, and illustration of a configuration corresponding to the antenna element 3070 illustrated in FIG. 5 is omitted. Furthermore, x, y, and z directions in FIG. 12 correspond to the x, y, and z directions in FIG. 5.

As illustrated in FIG. 12, the antenna device 3300 includes a first substrate 3310, a second substrate 3330, antenna elements 3350 and 3360, and dielectrics 3320 and 3340. Note that the first substrate 3310, the second substrate 3330, the dielectric 3320, and the dielectric 3340 have substantially similar configurations to the first substrate 3110, the second substrate 3130, the dielectric 3120, and the dielectric 3140 illustrated in FIG. 6. Therefore, detailed description is omitted. That is, substrates 3330*a* to 3330*c* and dielectrics 3340*a* to 3340*c* are substantially similar to the substrates 3130*a* to 3130*c* and the dielectrics 3140*a* to 3140*c* illustrated in FIG. 6. Furthermore, FIG. 13 is a schematic perspective view of the antenna device 3300, and corresponds to a view obtained by omitting illustration of dielectrics 3320 and 3340 in the example illustrated in FIG. 12, for easily understanding of the configurations of the antenna elements 3350 and 3360.

Figure 13:
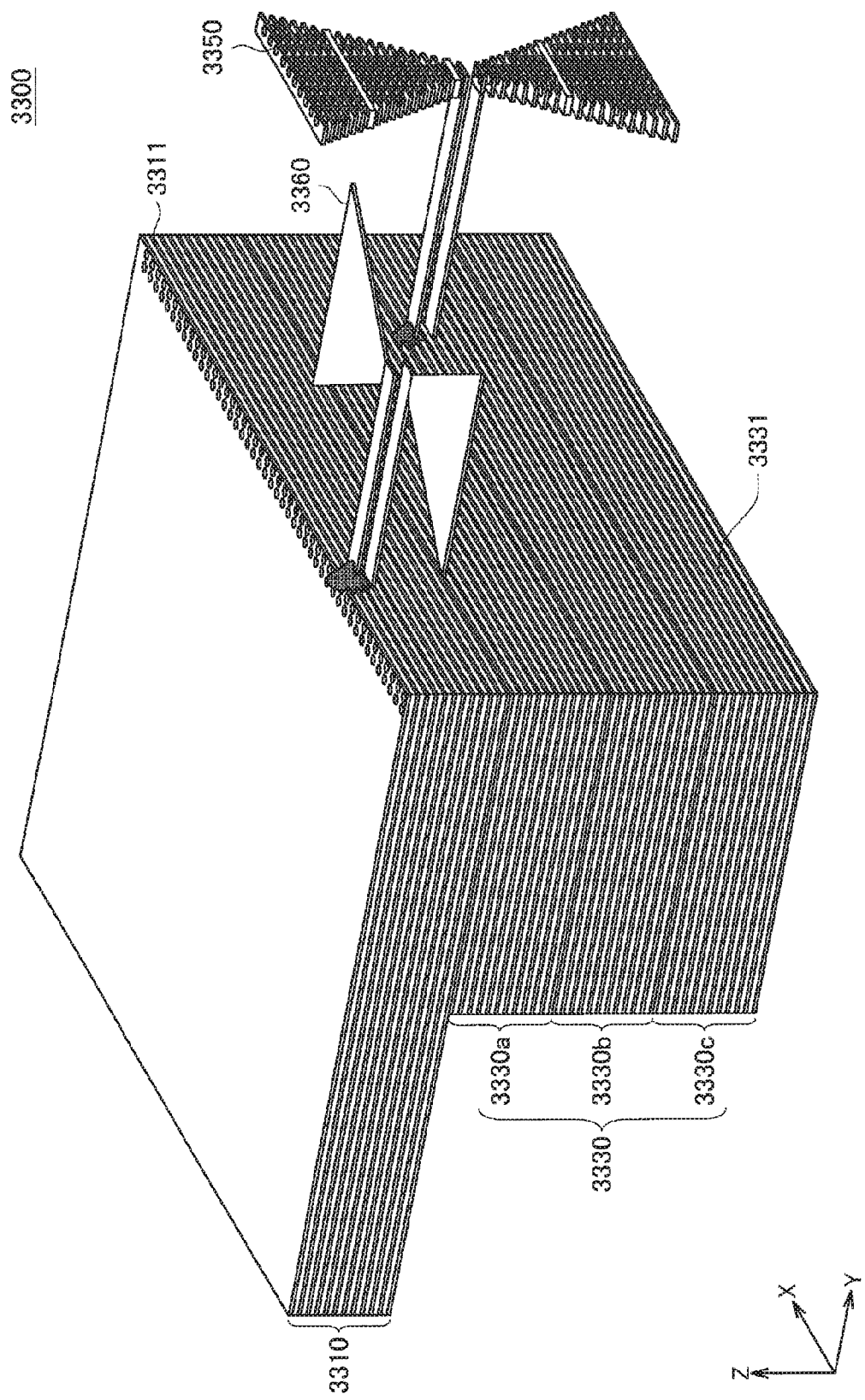
FIG. 13 is an explanatory view for describing the third configuration example of the antenna device according to the embodiment.

As illustrated in FIG. 13, the second substrate 3330 is formed to have a surface 3331 having a normal direction substantially coinciding with the y direction and extending in the z direction and the x direction. Furthermore, the antenna element 3350 is held on the surface 3331. The antenna element 3350 is configured as a dipole antenna having an element formed to extend in the z direction. In particular, in the example illustrated in FIG. 13, the antenna element 3350 is configured as a so-called bowtie dipole antenna. Note that, in this case, the element of the antenna element 3350 may be formed in a planar shape extending in the x direction and the z direction.

Furthermore, the antenna element 3360 is held on an end 3311 located in the +y direction of the first substrate 3310 and extending in the x direction. The antenna element 3360 is configured as a dipole antenna having an element formed to extend in the x direction. In particular, in the example illustrated in FIG. 13, the antenna element 3360 is configured as a so-called bowtie dipole antenna. Note that, in this case, the element of the antenna element 3360 may be formed in a planar shape extending in the x direction and the y direction.

Furthermore, as illustrated in FIG. 12, the dielectrics 3320 and 3340 are formed to include the antenna elements 3350 and 3360 in a region where the antenna elements 3350 and 3360 are held.

Figure 14:
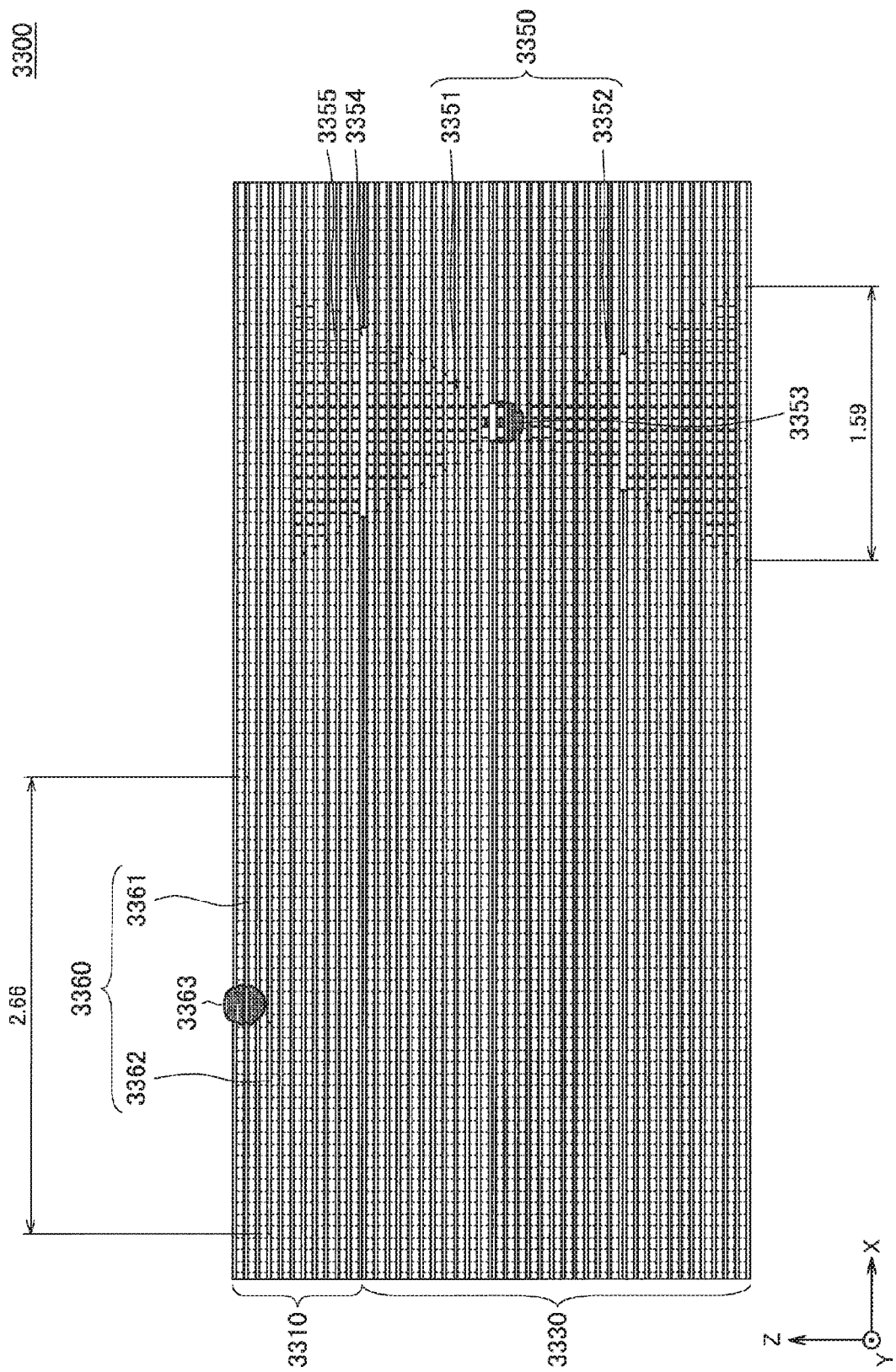
FIG. 14 is an explanatory view for describing the third configuration example of the antenna device according to the embodiment.

Here, an example of a more detailed configuration of the antenna elements 3350 and 3360 will be described with reference to FIGS. 14 and 15. FIG. 14 is a diagram illustrating an example of a configuration of the antenna device 3300 in a case where the antenna device 3300 illustrated in FIG. 13 is viewed from the y direction. Furthermore, FIG. 15 is a diagram illustrating an example of a configuration of the antenna device 3300 in a case where the antenna device 3300 illustrated in FIG. 13 is viewed from the x direction.

As illustrated in FIG. 14, the antenna element 3350 includes a feeding point 3353 and elements 3351 and 3352. The element 3351 is formed to extend in the +z direction with reference to a position in the z direction where the feeding point 3353 is provided. Furthermore, the element 3352 is formed to extend in the −z direction with reference to the position in the z direction where the feeding point 3353 is provided. Furthermore, each of the elements 3351 and 3352 includes a plurality of elements 3354 formed in a long shape to extend in the x direction, and a plurality of elements 3355 formed in a long shape to extend in the z direction. Each of the elements 3354 and 3355 is formed using a conductive material such as a metal. Furthermore, the plurality of elements 3355 is formed to electrically connect the plurality of elements 3354, respectively. Note that the antenna element 3350 corresponds to an example of a "first antenna element".

Furthermore, the antenna element 3360 includes a feeding point 3363 and elements 3361 and 3362. The element 3361 is formed to extend in the +x direction with reference to a position in the x direction where the feeding point 3363 is provided. Furthermore, the element 3362 is formed to extend in the −x direction with reference to the position in the x direction where the feeding point 3363 is provided. Note that the antenna element 3360 corresponds to an example of a "second antenna element".

Figure 15:
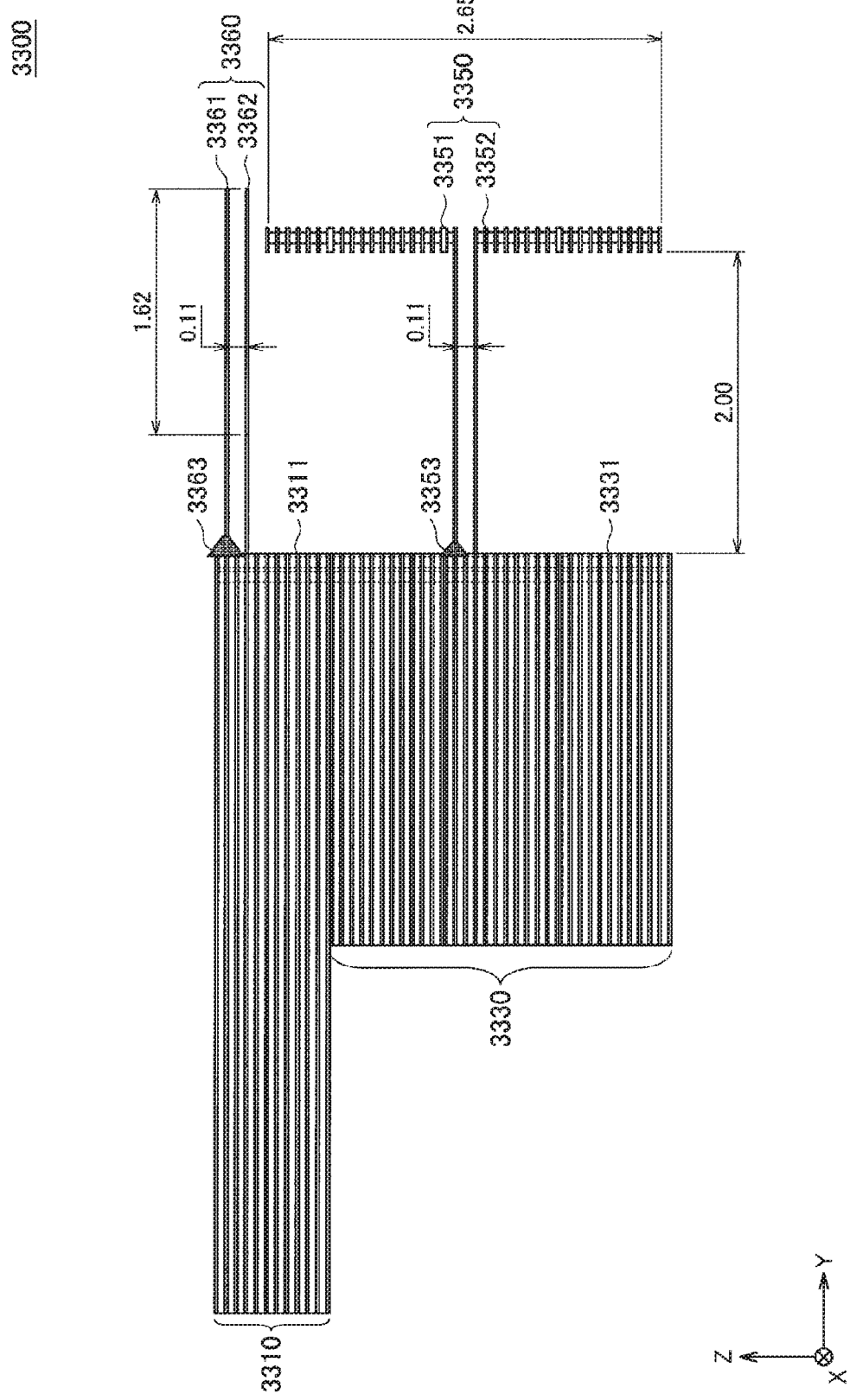
FIG. 15 is an explanatory view for describing the third configuration example of the antenna device according to the embodiment.

Furthermore, as illustrated in FIG. 15, the antenna element 3350 is electrically connected with the surface 3331 of the second substrate 3330 at the feeding point 3353. That is, a current supplied through wiring provided in the second substrate 3330 is supplied to the antenna element 3350 through the feeding point 3353. When the current is supplied to the antenna element 3350 via the feeding point 3353, for example, on the basis of such a configuration, the current flows in the z direction through the elements 3351 and 3352 of the antenna element 3350 and a polarized wave $R_V$ having a polarization direction substantially coinciding with the z direction becomes able to be transmitted or received.

Furthermore, the antenna element 3360 is electrically connected with the end 3311 of the first substrate 3310 at the feeding point 3363. That is, the current supplied through wiring provided in the first substrate 3310 is supplied to the antenna element 3360 through the feeding point 3363. When the current is supplied to the antenna element 3360 via the feeding point 3363, for example, on the basis of such a configuration, the current flows in the x direction through the elements 3361 and 3362 of the antenna element 3360 and a polarized wave $R_H$ having a polarization direction substantially coinciding with the x direction becomes able to be transmitted or received.

Note that the antenna element 3350 can be formed by, for example, cutting out from the second substrate 3330 by etching or the like. Specifically, a plurality of wiring layers forming the second substrate 3330 is electrically connected to one another by forming vias in the z-direction. Note that, at this time, the via corresponds to the element 3355 illustrated in FIG. 14, and a part of the wiring layer corresponds to the element 3354. Thereafter, the antenna element 3350 is simply formed by cutting out by etching or the like such that a portion where the via (element 3355) is formed is exposed in the y direction. With such a configuration, the antenna element 3350 has a configuration in which the elements 3354 are stacked in the thickness direction. Similarly, the antenna element 3360 can be formed by cutting out from the first substrate 3310 by etching or the like. Of course, the method for forming the above-described antenna elements 3350 and 3360 is only an example. That is, the method for forming the antenna element 3350 is not particularly limited as long as the antenna element 3350 can be formed as a dipole antenna having an element formed to extend in the z direction. Similarly, the method for forming the antenna element 3360 is not particularly limited as long as the antenna element 3360 can be formed as a dipole antenna having an element formed to extend in the x direction.

Note that the dimension of the antenna elements 3350 and 3360 is determined according to the frequency of the wireless signal to be transmitted or received. For example, the example illustrated in FIGS. 14 and 15 assume a case where a 28-GHz band (for example, 26.5 GHz to 29.5 GHz) wireless signal is transmitted or received as the polarized wave $R_H$ and the polarized wave $R_V$.

For example, in the example illustrated in FIGS. 14 and 15, the elements 3351 and 3352 of the antenna element 3350 have the width of 1.59 mm in a portion having the largest width in the x direction, and have the width of 2.65 mm as the width in the z direction. Furthermore, the element 3351 and the element 3352 are formed to be separated from each other by 0.11 mm in the z direction. Furthermore, the portions extending in the z direction of the elements 3351 and 3352 are formed to be separated from the surface 3331 of the second substrate 3330 by 2.00 mm in the y direction.

Furthermore, the elements 3361 and 3362 of the antenna element 3360 have the width of 1.62 mm in a portion having the largest width in the y direction, and have the width of 2.66 mm as the width in the x direction. Furthermore, the element 3361 and the element 3362 are formed to be separated from each other by 0.11 mm in the z direction.

Figure 16:
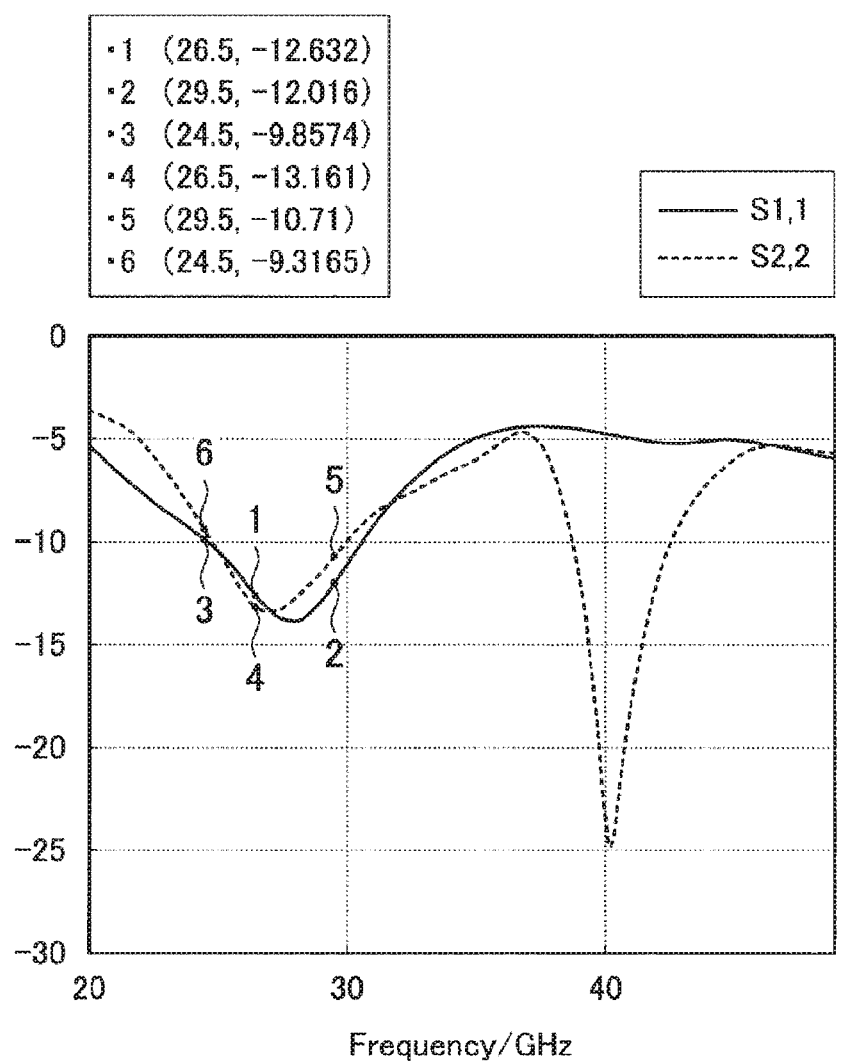
FIG. 16 is a graph illustrating an example of simulation results of antenna characteristics of the antenna device according to the third configuration example of the embodiment.

Here, an example of antenna characteristics of the antenna device 3300 according to the present configuration example will be described with reference to FIG. 16. FIG. 16 is a graph illustrating an example of simulation results of antenna characteristics of the antenna device according to the third configuration example of the present embodiment. In FIG. 16, the horizontal axis represents a frequency, and the vertical axis represents a gain. Furthermore, in FIG. 16, the simulation results illustrated with "S1, 1" indicate the antenna characteristics regarding transmission or reception of the polarized wave $R_H$, and the simulation results illustrated with "S2, 2" indicate the antenna characteristics regarding transmission or reception of the polarized wave $R_V$. As illustrated in FIG. 16, the antenna device 3300 can secure a return loss of about 10 dB or more for both the polarized wave $R_H$ and the polarized wave $R_V$ in the band of 26.5 GHz to 29.5 GHz. Furthermore, the antenna device 3300 can secure a return loss of about 10 dB for both the polarized wave $R_H$ and the polarized wave $R_V$ in the case of 24.5 GHz.

An example of the configuration of the antenna device according to the present embodiment in the case where a dipole antenna is applied as the antenna element 3050 illustrated in FIG. 5 has been described as the third configuration example with reference to FIGS. 12 to 16.

3.3.4. Fourth Configuration Example

Next, as a fourth configuration example, an example of a configuration of the antenna device according to the present embodiment in a case where the antenna elements 3350 and 3360 according to the third configuration example are arrayed will be described. Note that, in the following description, the antenna device to be described as the fourth configuration example may be referred to as an "antenna device 3400" to be distinguished from antenna devices according to other configuration examples.

Figure 17:
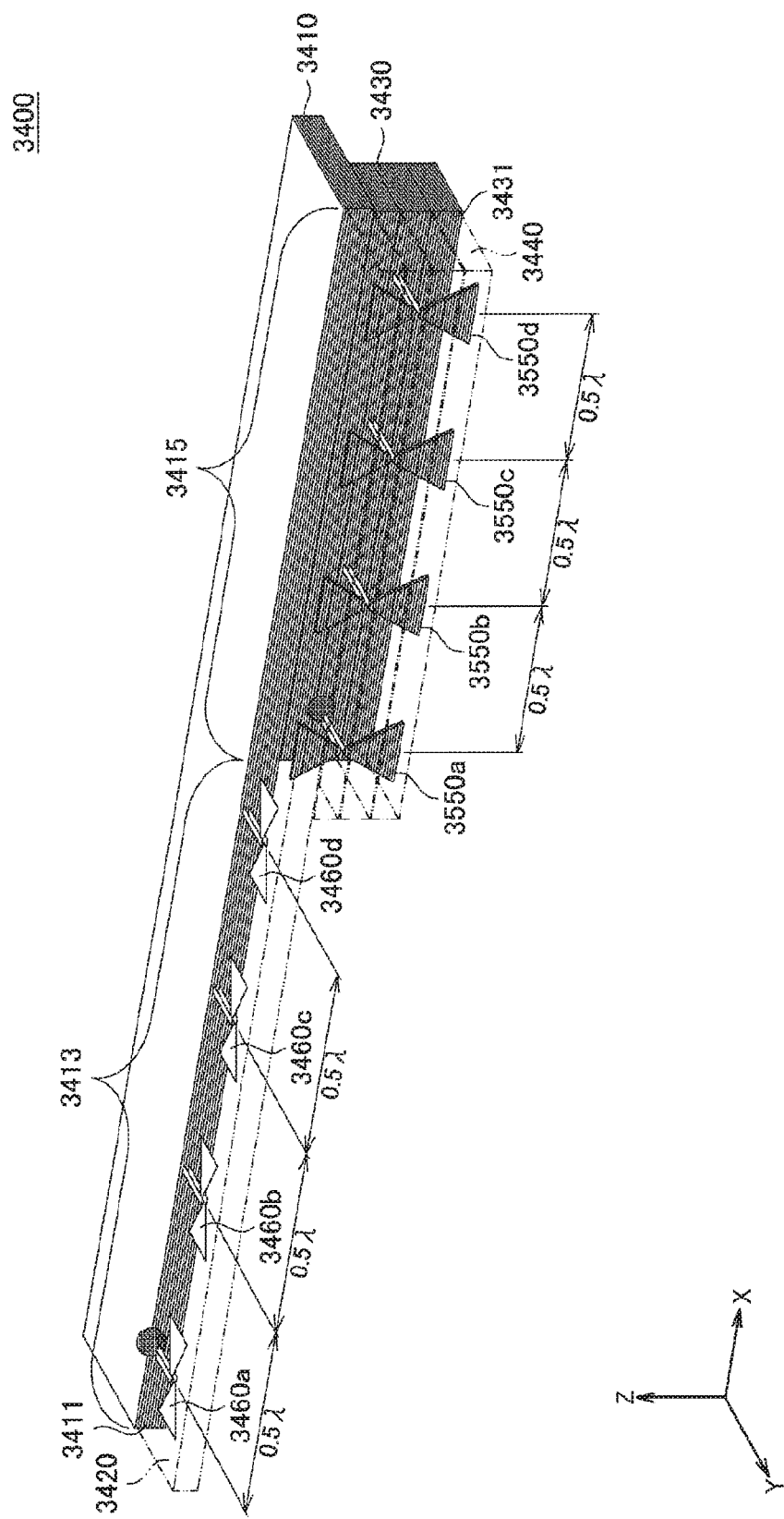
FIG. 17 is an explanatory view for describing a fourth configuration example of the antenna device according to the embodiment.

For example, FIG. 17 is an explanatory view for describing the fourth configuration example of the antenna device according to the present embodiment, and illustrates a schematic perspective view of the antenna device according to the present configuration example. Note that x, y, and z directions in FIG. 17 correspond to the x, y, and z directions in FIGS. 12 to 16.

As illustrated in FIG. 17, the antenna device 3400 includes a first substrate 3410, a second substrate 3430, antenna elements 3450a to 3450d, antenna elements 3460a to 3460d, and dielectrics 3420 and 3440. The first substrate 3410, the second substrate 3430, the dielectric 3420, and the dielectric 3440 respectively correspond to the first substrate 3310, the second substrate 3330, the dielectric 3320, and the dielectric 3340 in the antenna device 3300 illustrated in FIG. 12.

As illustrated in FIG. 17, the plurality of antenna elements 3460 (that is, the antenna elements 3460a to 3460d) is supported on an end 3411 in the +y direction of the first substrate 3410 to be arrayed along the x direction. Furthermore, at this time, the plurality of antenna elements 3460 is supported on the first substrate 3410 to be separated from one another in the x direction.

Furthermore, in the antenna device 3400, the first substrate 3410 is formed to further extend in the +x direction from a region 3413 along the x direction where the plurality of antenna elements 3460 is held. Note that, in the following description, a region further extending in the +x direction from the region 3413 and different from the region 3413, of a region defined along the x direction in the first substrate 3410, is also referred to as a "region 3415". In the antenna device 3400, the second substrate 3430 is supported on the first substrate 3410 in a region 3415, of the region along the x direction in the first substrate 3410. Note that the region (for example, the region 3413) where the plurality of antenna elements 3460 is held, of the region along the x direction of the first substrate 3410, corresponds to an example of a "second region". Furthermore, the region (for example, the region 3415) different from the second region, of the region along the x direction of the first substrate 3410, corresponds to an example of a "third region".

Furthermore, the plurality of antenna elements 3450 (that is, the antenna elements 3450a to 3450d) is supported on a surface 3431 in the +y direction of the second substrate 3430 to be arrayed along the x direction. Furthermore, at this time, the plurality of antenna elements 3450 is supported on the second substrate 3430 to be separated from one another in the x direction. That is, in the antenna device 3400, the region where the plurality of antenna elements 3450 is held is adjacent in the z direction to the another region 3415 different from the region 3413 where the plurality of antenna elements 3460 is held, of the first substrate 3410. Note that the region (for example, the region adjacent in the z direction to the region 3415) where the plurality of antenna elements 3450 is held, of a region along the x direction of the second substrate 3430, corresponds to an example of a "first region".

Note that, in a case of configuring an array antenna by disposing a plurality of the antenna elements 3450 and 3460, it is desirable to set an interval between adjacent two antenna elements in consideration of a beam scanning angle at which a grating lobe appears in a visible region.

Figure 18:
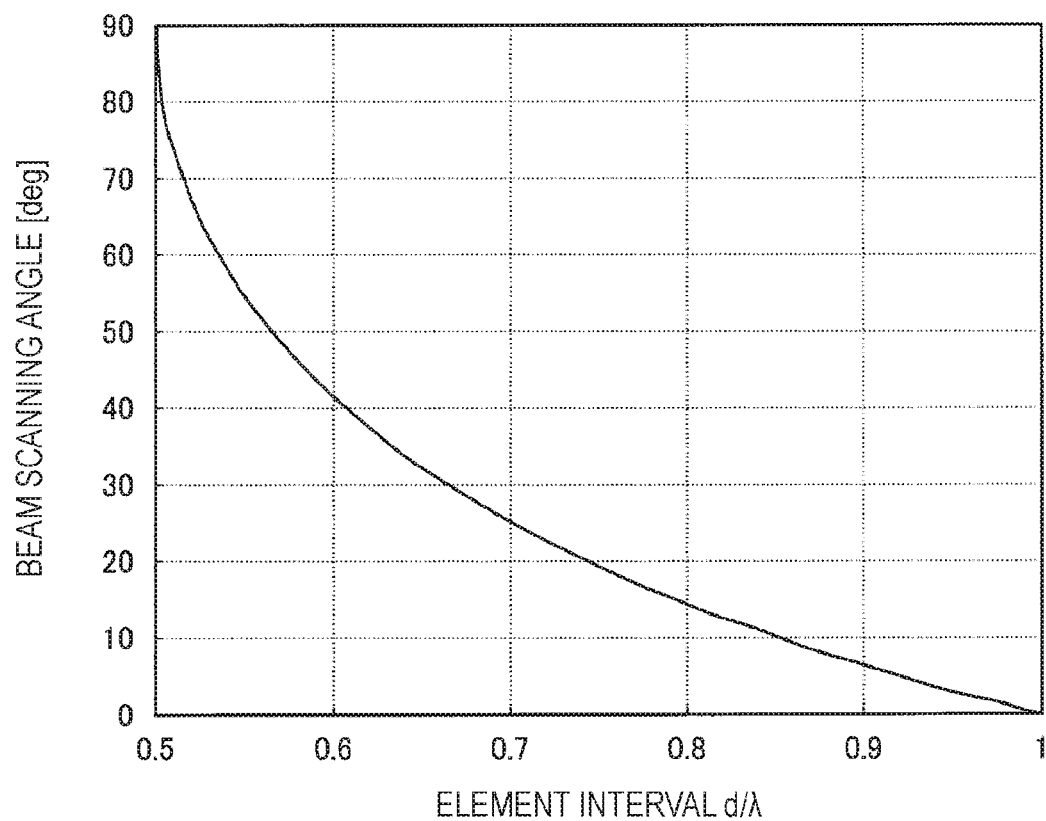
FIG. 18 is a graph illustrating an example of a relationship between an element interval of antenna elements adjacent to each other and a beam scanning angle at which a grating lobe appears in a visible region.

For example, FIG. 18 illustrates an example of a relationship between an element interval of antenna elements adjacent to each other and a beam scanning angle at which a grating lobe appears in a visible region. In FIG. 18, the horizontal axis represents the element interval $d/\lambda$, and the vertical axis represents the beam scanning angle [deg]. Note that the information illustrated in FIG. 18 is disclosed in "Volume 2, Group 4 Antennas/propagation" in a knowledge base "Chishiki-no-Mori" provided by the Institute of Electrical and Electronics Engineers (Toru Takahashi, "Chapter 7 Array Antenna", [online], 2013, The Institute of Electronics, Information and Communication Engineers (IEICE), [searched on Oct. 5, 2015], Internet <URL: http://www.ieice-hbkb.org/files/04/04gun_02hen_07.pdf>).

In the case of configuring an array antenna, an interval between respective feeding points of adjacent two antenna elements is generally adjusted to be $0.5\lambda$ to $0.9\lambda$ in a case where the wavelength of a wireless signal to be transmitted or received is $\lambda$. Note that, to suppress the grating lobe and obtain more favorable antenna characteristics from the relationship illustrated in FIG. 18, it is desirable to hold the antenna elements such that the interval between respective feeding points of adjacent two antenna elements becomes about $0.5\lambda$, for example.

Therefore, in the example illustrated in FIG. 17, the plurality of antenna elements 3460 is held by the first substrate 3410 such that the interval in the x direction between adjacent two antenna elements 3460 becomes about $0.5\lambda$. Similarly, the plurality of antenna elements 3450 is held by the second substrate 3430 such that the interval in the x direction between adjacent two antenna elements 3450 becomes about $0.5\lambda$.

An example of the configuration of the antenna device according to the present embodiment in the case where the antenna elements 3350 and 3360 according to the third configuration example are arrayed has been described as the fourth configuration example.

3.3.5. Fifth Configuration Example

Next, as a fifth configuration example, another example of a configuration of the antenna device according to the present embodiment in the case where the antenna elements 3350 and 3360 according to the third configuration example are arrayed will be described. Note that, in the following description, the antenna device to be described as the fifth configuration example may be referred to as an "antenna device 3500" to be distinguished from antenna devices according to other configuration examples.

Figure 19:
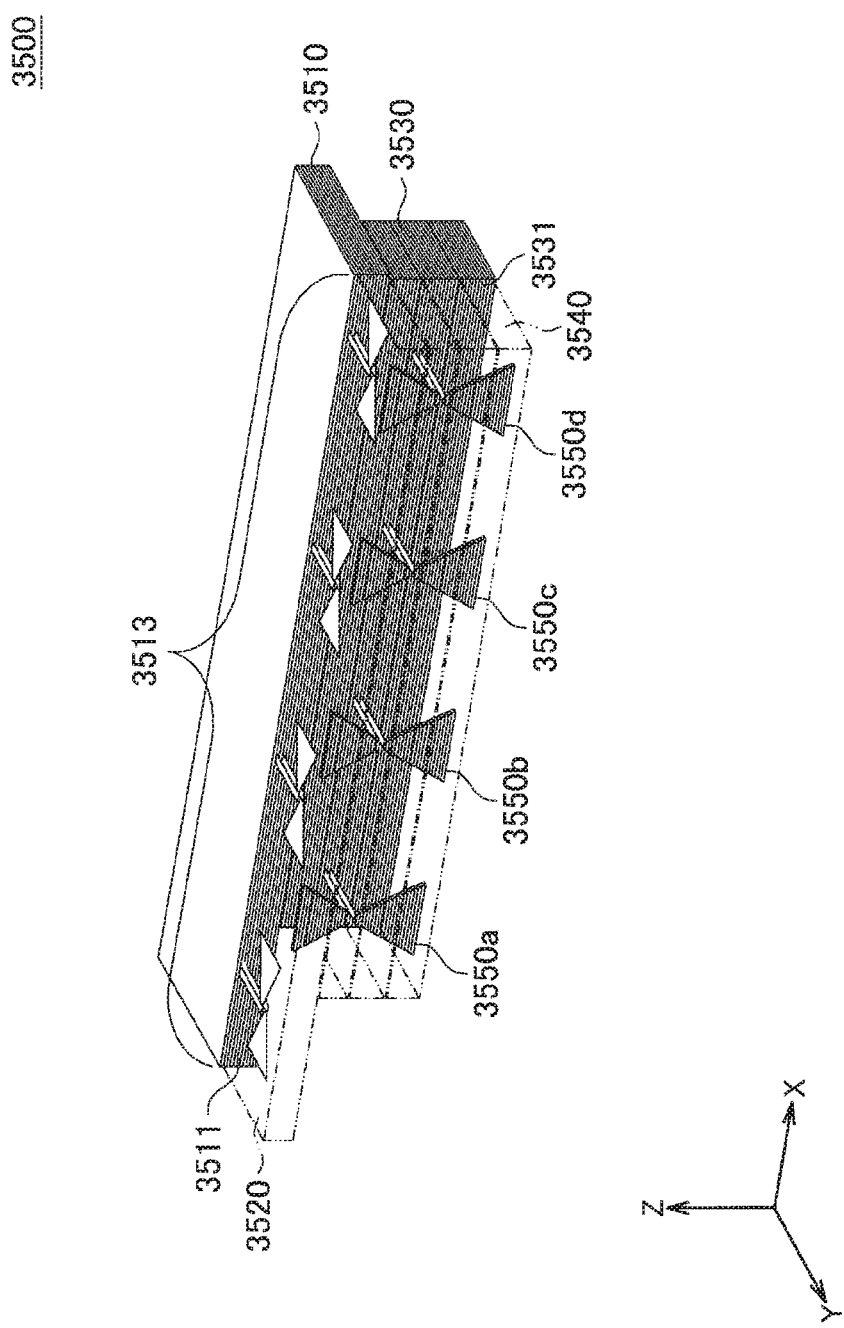
FIG. 19 is an explanatory view for describing a fifth configuration example of the antenna device according to the embodiment.

For example, FIG. 19 is an explanatory view for describing the fifth configuration example of the antenna device according to the present embodiment, and illustrates a schematic perspective view of the antenna device according to the present configuration example. Note that x, y, and z directions in FIG. 19 correspond to the x, y, and z directions in FIGS. 12 to 16.

As illustrated in FIG. 19, the antenna device 3500 includes a first substrate 3510, a second substrate 3530, antenna elements 3550a to 3550d, antenna elements 3560a to 3560d, and dielectrics 3520 and 3540. The first substrate 3510, the second substrate 3530, the dielectric 3520, and the dielectric 3540 respectively correspond to the first substrate 3310, the second substrate 3330, the dielectric 3320, and the dielectric 3340 in the antenna device 3300 illustrated in FIG. 12.

As illustrated in FIG. 19, the plurality of antenna elements 3560 (that is, the antenna elements 3560a to 3560d) is supported on an end 3511 in the +y direction of the first substrate 3510 to be arrayed along the x direction. Furthermore, at this time, the plurality of antenna elements 3560 is supported on the first substrate 3510 to be separated from one another in the x direction.

Furthermore, the plurality of antenna elements 3550 (that is, the antenna elements 3550a to 3550d) is supported on a surface 3531 in the +y direction of the second substrate 3530 to be arrayed along the x direction. Furthermore, at this time, the plurality of antenna elements 3550 is supported on the second substrate 3530 to be separated from one another in the x direction.

Meanwhile, the antenna device 3500 is different from the antenna device 3400 according to the fourth configuration example in the positional relationship between the first substrate 3510 and the second substrate 3530. Specifically, in the antenna device 3500, the second substrate 3530 is supported on the first substrate 3510 in a region 3513 along the x direction where the plurality of antenna elements 3560 is held in the first substrate 3510. That is, in the antenna device 3500, the region where the plurality of antenna elements 3550 is held is located (for example, adjacent) in the z direction to the another region 3413 where the plurality of antenna elements 3560 is held, of the first substrate 3510. With such a configuration, the antenna device 3500 can have a smaller size in the x direction than the antenna device 3400 illustrated in FIG. 17.

Figure 20:
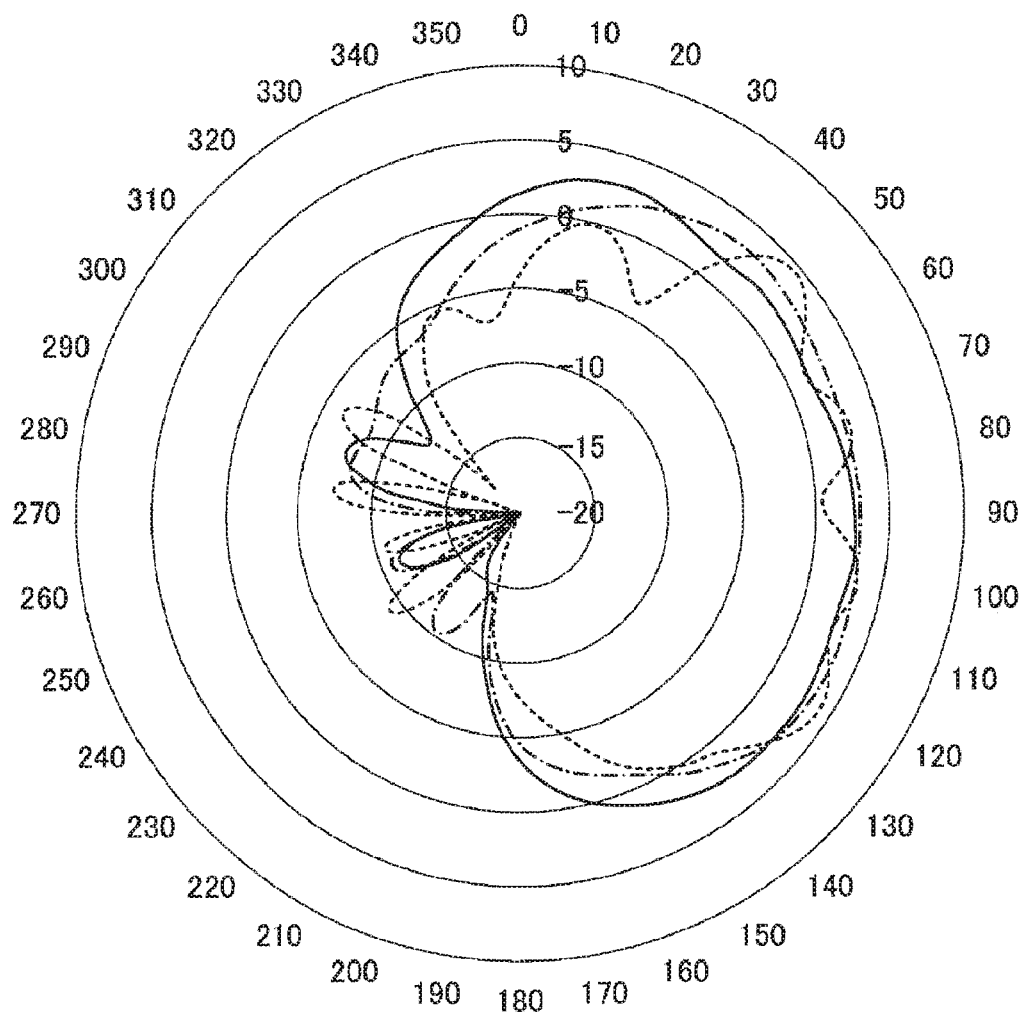
FIG. 20 is a graph illustrating an example of simulation results of radiation patterns in a horizontal direction of the antenna device according to the fifth configuration example of the embodiment.
Figure 21:
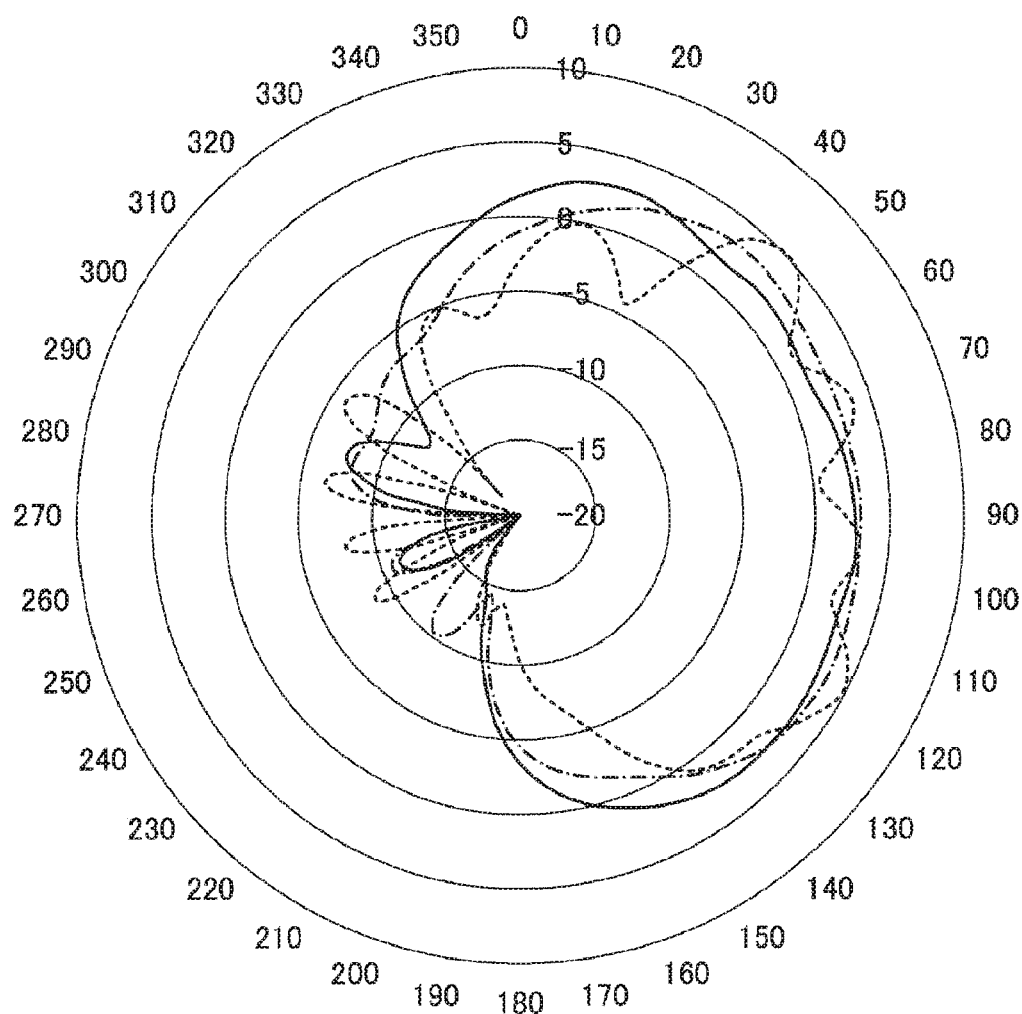
FIG. 21 is a graph illustrating an example of simulation results of the radiation patterns in the horizontal direction of the antenna device according to the fifth configuration example of the embodiment.
Figure 22:
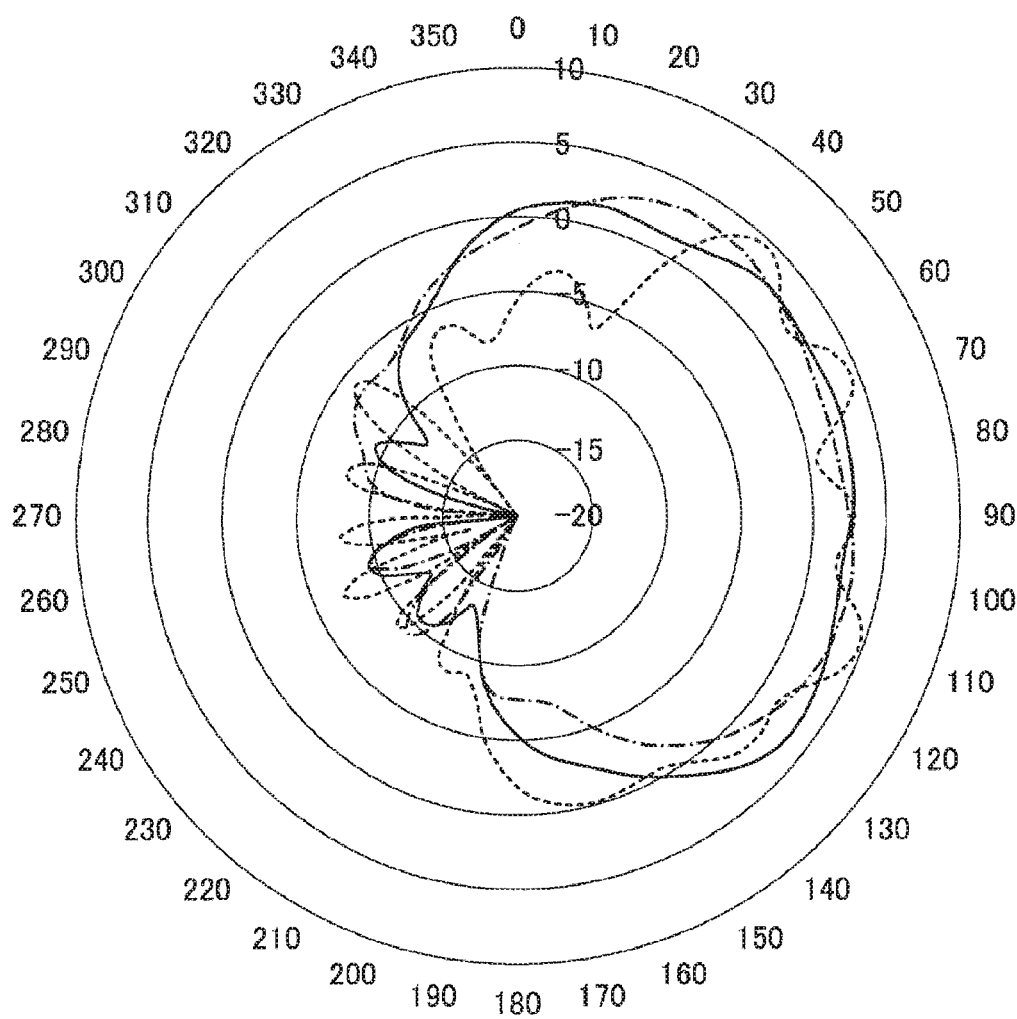
FIG. 22 is a graph illustrating an example of simulation results of the radiation patterns in the horizontal direction of the antenna device according to the fifth configuration example of the embodiment.

Here, characteristics of radiation patterns of the antenna device 3500 according to the present configuration example will be described with reference to FIGS. 20 to 22 on the basis of a comparison with the antenna device 3400 according to the fourth configuration example described with reference to FIG. 17. FIGS. 20 to 22 are graphs illustrating examples of simulation results of radiation patterns (that is, the radiation patterns on the xy plane) in the horizontal direction of the antenna device 3500 according to the fifth configuration example of the present embodiment. Note that FIGS. 20, 21, and 22 illustrate simulation results in a case where frequencies of a transmitted or received wireless signal are 26.5 GHz, 28 GHz, and 29.5 GHz, respectively.

Furthermore, in FIGS. 20 to 22, "sample1" indicates an example of a simulation result of the radiation pattern of an antenna element 3560b in the case where the array antenna is configured only by the plurality of antenna elements 3560a to 3560d held on the first substrate 3510. That is, it is assumed that "sample1" does not include the plurality of antenna elements 3550 held on the second substrate 3530. Note that in sample1, the width of the first substrate 3510 in the x direction is set to 20 mm. Furthermore, "sample2" indicates an example of a simulation result of the radiation pattern of an antenna element 3460b in the antenna device 3400 illustrated in FIG. 17. Note that in sample2, the width of the first substrate 3410 in the x direction is set to 35 mm. Furthermore, "sample3" indicates an example of a simulation result of the radiation pattern of the antenna element 3560b in the antenna device 3500 illustrated in FIG. 19. Note that in sample3, the width of the first substrate 3510 in the x direction is set to 20 mm.

As illustrated in FIGS. 20 to 22, in sample2, turbulence is caused in the radiation patterns. This is because the first substrate 3410 serves as a ground, and it is presumed that a current flowing through a portion of the ground, the portion being formed to further extend in the +x direction from the region 3413 where the antenna elements 3460a to 3460d are held (that is, a portion corresponding to the region 3415), causes the turbulence. That is, it is presumed that, in the direction in which the ground (that is, the first substrate 3410) extends, the wireless signal is affected by the current flowing through the ground, and as a result, the turbulence is caused in the radiation patterns.

In contrast, it is found that, in sample3, the turbulence of the radiation patterns caused in sample2 is suppressed, and radiation patterns close to those of sample1 (that is, more ideal radiation patterns) are exhibited. That is, according to the antenna device 3500 of the present configuration example, a more ideal radiation pattern can be obtained in the horizontal direction (that is, on the xy plane) than the antenna device 3400 described as the fourth configuration example.

Another example of the configuration of the antenna device according to the present embodiment in the case where the antenna elements 3350 and 3360 according to the third configuration example are arrayed has been described as the fifth configuration example with reference to FIGS. 19 to 22.

3.3.6. Sixth Configuration Example

Next, as a sixth configuration example, another example of a configuration of the antenna device according to the present embodiment in the case where the antenna elements 3350 and 3360 according to the third configuration example are arrayed will be described. Note that, in the following description, the antenna device to be described as the sixth configuration example may be referred to as an "antenna device 3600" to be distinguished from antenna devices according to other configuration examples.

Figure 23:
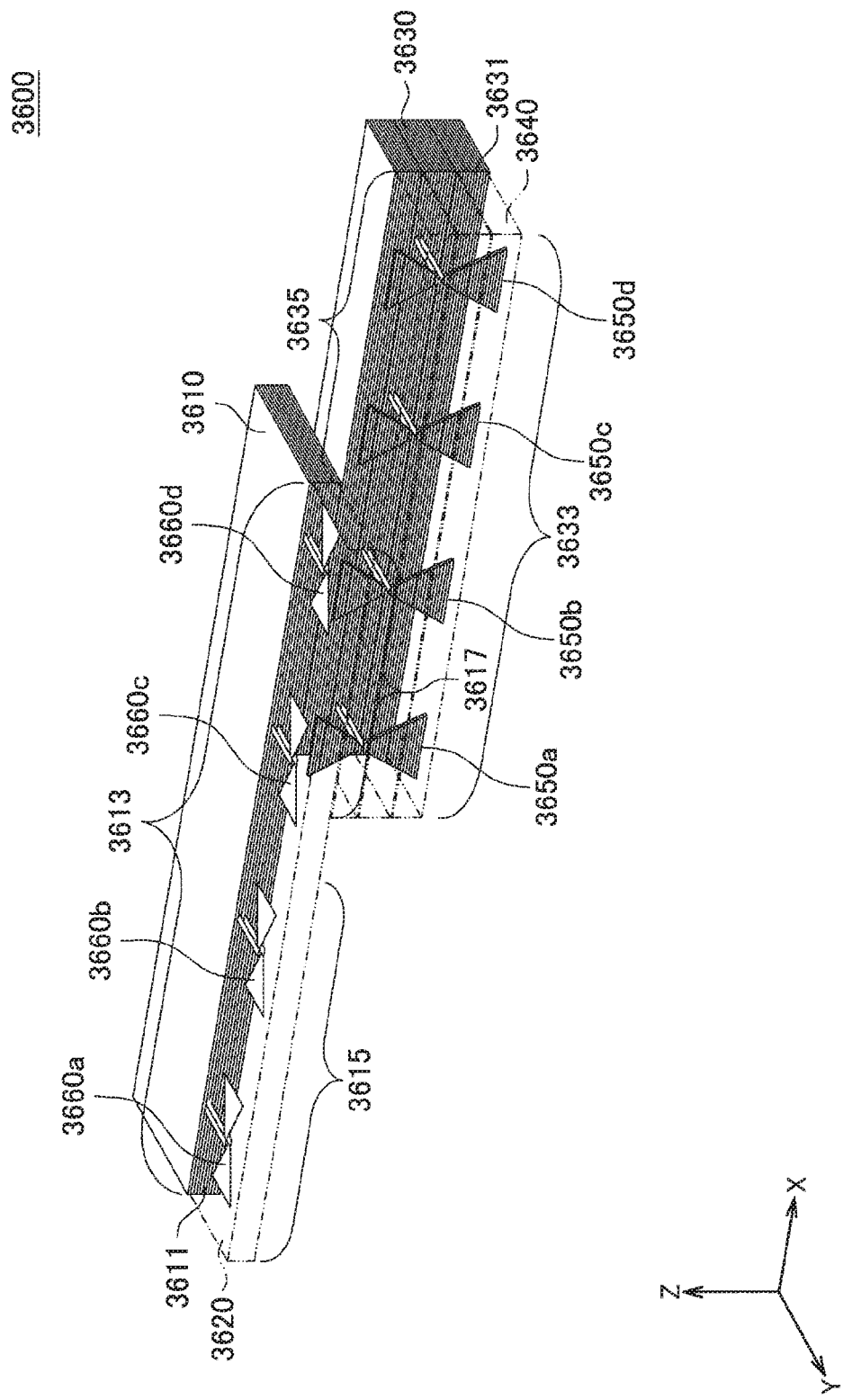
FIG. 23 is an explanatory view for describing a sixth configuration example of the antenna device according to the embodiment.

For example, FIG. 23 is an explanatory view for describing the sixth configuration example of the antenna device according to the present embodiment, and illustrates a schematic perspective view of the antenna device according to the present configuration example. Note that x, y, and z directions in FIG. 23 correspond to the x, y, and z directions in FIGS. 12 to 16.

As illustrated in FIG. 23, the antenna device 3600 includes a first substrate 3610, a second substrate 3630, antenna elements 3650a to 3650d, antenna elements 3660a to 3660d, and dielectrics 3620 and 3640. The first substrate 3610, the second substrate 3630, the dielectric 3620, and the dielectric 3640 respectively correspond to the first substrate 3310, the second substrate 3330, the dielectric 3320, and the dielectric 3340 in the antenna device 3300 illustrated in FIG. 12.

As illustrated in FIG. 23, the plurality of antenna elements 3660 (that is, the antenna elements 3660a to 3660d) is supported on an end 3611 in the +y direction of the first substrate 3610 to be arrayed along the x direction. Furthermore, at this time, the plurality of antenna elements 3660 is supported on the first substrate 3610 to be separated from one another in the x direction.

Furthermore, the plurality of antenna elements 3650 (that is, the antenna elements 3650a to 3650d) is supported on an end 3631 in the +y direction of the second substrate 3630 to be arrayed along the x direction. Furthermore, at this time, the plurality of antenna elements 3650 is supported on the second substrate 3630 to be separated from one another in the x direction.

Meanwhile, the antenna device 3600 is different from the antenna device 3400 according to the fourth configuration example and the antenna device 3500 according to the fifth configuration example in the positional relationship between the first substrate 3610 and the second substrate 3630. Specifically, in the antenna device 3600, the second substrate 3630 is supported on the first substrate 3510 in a partial region 3617 of a region 3613 along the x direction where the plurality of antenna elements 3660 is held in the first substrate 3610. Furthermore, at this time, the second substrate 3530 is supported on the first substrate 3610 such that a partial region of a region 3633 along the x direction where the plurality of antenna elements 3650 is held is adjacent in the z direction to the region 3617 of the first substrate 3610.

With such a configuration, a portion corresponding to a region 3615 of the first substrate 3610 further protrudes in the −x direction from an end in the −x direction of the second substrate 3630. That is, since the second substrate 3630 is not located (not adjacent) in the z direction to the region 3615 of the first substrate 3610, the dielectric 3640 is not formed in a region located in the −z direction with respect to the region 3615. Furthermore, another region 3635 other than the region (adjacent region) located in the z direction with respect to the region 3617 of the first substrate 3610, of the region 3633 along the x direction of the second substrate 3630, further protrudes in the +x direction from an end in the +x direction of the first substrate 3610. That is, since the first substrate 3610 is not located (not adjacent) in the z direction to the region 3635 of the second substrate 3630, the dielectric 3620 is not formed in a region located in the +z direction with respect to the region 3635.

Note that, in the following description, the antenna elements 3660a and 3660b of the antenna elements 3660a to 3660d are held in the region 3615. That is, in the antenna device 3600 illustrated in FIG. 23, the dielectric 3640 is not formed in a region located in the −z direction with respect to the antenna elements 3660a and 3660b. Furthermore, the antenna elements 3650c and 3650d of the antenna elements 3650a to 3650d are held in the region 3635. That is, in the antenna device 3600 illustrated in FIG. 23, the dielectric 3620 is not formed in a region located in the +z direction with respect to the antenna elements 3650c and 3650d.

Figure 24:
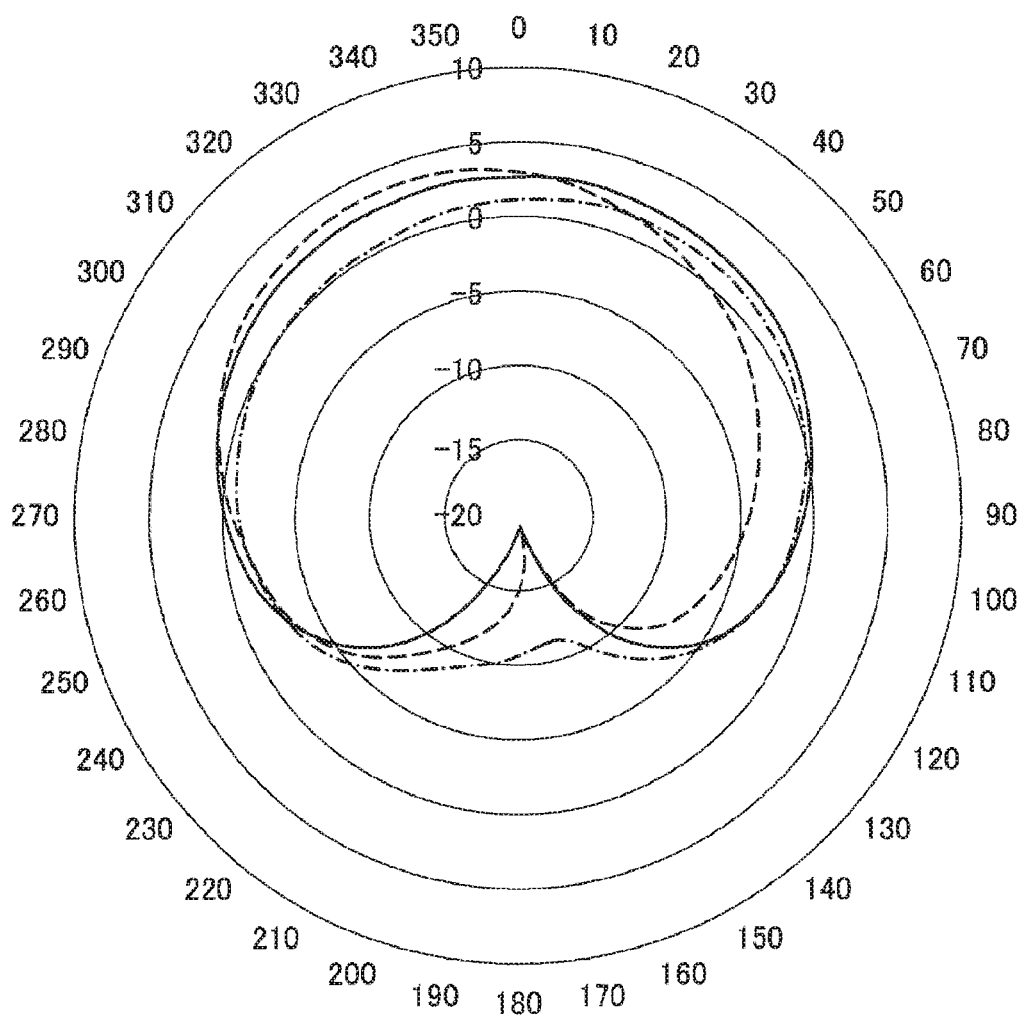
FIG. 24 is a graph illustrating an example of simulation results of radiation patterns in a vertical direction of the antenna device according to the sixth configuration example of the embodiment.
Figure 25:
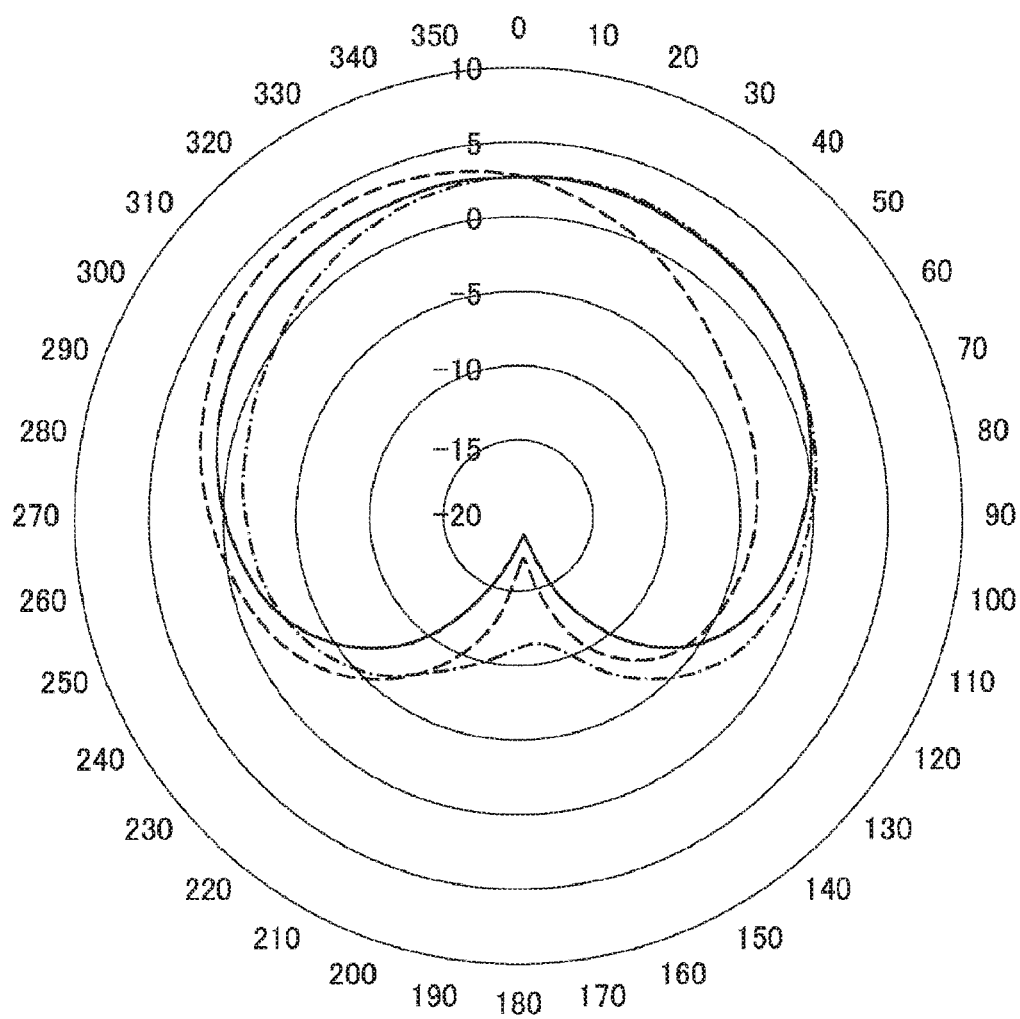
FIG. 25 is a graph illustrating an example of simulation results of the radiation patterns in the vertical direction of the antenna device according to the sixth configuration example of the embodiment.

Here, characteristics of radiation patterns of the antenna device 3600 according to the present configuration example will be described with reference to FIGS. 24 to 26 on the basis of a comparison with the antenna device 3500 according to the fifth configuration example described with reference to FIG. 19. FIGS. 24 to 26 are graphs illustrating examples of simulation results of radiation patterns (that is, the radiation patterns on the yz plane) in the vertical direction of the antenna device 3600 according to the sixth configuration example of the present embodiment. Note that FIGS. 24, 25, and 26 illustrate simulation results in a case where frequencies of a transmitted or received wireless signal are 26.5 GHz, 28 GHz, and 29.5 GHz, respectively.

Furthermore, in FIGS. 24 to 26, "sample4" indicates an example of a simulation result of the radiation pattern of the antenna element 3660b in the case where the array antenna is configured only by the plurality of antenna elements 3660a to 3660d held on the first substrate 3610. That is, it is assumed that "sample4" does not include the plurality of antenna elements 3650 held on the second substrate 3630. Note that, in sample4, the width of the first substrate 3610 in the x direction is set to 20 mm. Furthermore, "sample5" indicates an example of a simulation result of the radiation pattern of the antenna element 3560b in the antenna device 3500 illustrated in FIG. 19. Note that, in sample5, the width in the x direction of the antenna device 3500 (that is, the width in the x direction of the first substrate 3510) is set to 20 mm. Furthermore, "sample6" indicates an example of a simulation result of the radiation pattern of the antenna element 3660b in the antenna device 3600 illustrated in FIG. 23. Note that, in sample6, the width in the x direction of the antenna device 3600 is set to 26 mm.

As illustrated in FIGS. 24 to 26, in sample5, the radiation patterns are distorted in the −z direction. This is because the dielectric 3540 is formed in the −z direction with respect to the antenna element 3560b, and it is presumed that a distortion in the −z direction (that is, a distortion toward the dielectric 3540) is caused in the radiation patterns due to the influence of the dielectric 3540.

In contrast, it is found that, in sample6, the distortion of the radiation patterns caused in sample5 is suppressed, and radiation patterns close to those of sample4 (that is, more ideal radiation patterns) are exhibited. That is, according to the antenna device 3600 of the present configuration example, a more ideal radiation pattern can be obtained in the vertical direction (that is, on the yz plane) than the antenna device 3500 described as the fifth configuration example.

Note that, in the above description, the case of arraying the antenna elements 3350 and 3360 according to the third configuration example has been described. However, the present configuration example can be applied to a case of adopting the antenna elements 3350 and 3360 one each. In this case, the antenna elements 3350 and 3360 are simply held to have the positional relationship between the antenna elements 3650c or 3650d and the antenna elements 3660a or 3660b illustrated in FIG. 23, for example. Specifically, the antenna elements 3350 and 3360 are simply held such that the dielectric 3320 is not formed in the +z direction with respect to the antenna element 3350, and the dielectric 3340 is not formed in the −z direction with respect to the antenna element 3360.

Another example of the configuration of the antenna device according to the present embodiment in the case where the antenna elements 3350 and 3360 according to the third configuration example are arrayed has been described as the sixth configuration example with reference to FIGS. 23 to 26.

3.3.7. Seventh Configuration Example

Next, as a seventh configuration example, another example of a configuration of the antenna device according to the present embodiment in the case where the antenna elements 3350 and 3360 according to the third configuration example are arrayed will be described. Note that, in the following description, the antenna device to be described as the seventh configuration example may be referred to as an "antenna device 3700" to be distinguished from antenna devices according to other configuration examples.

Figure 27:
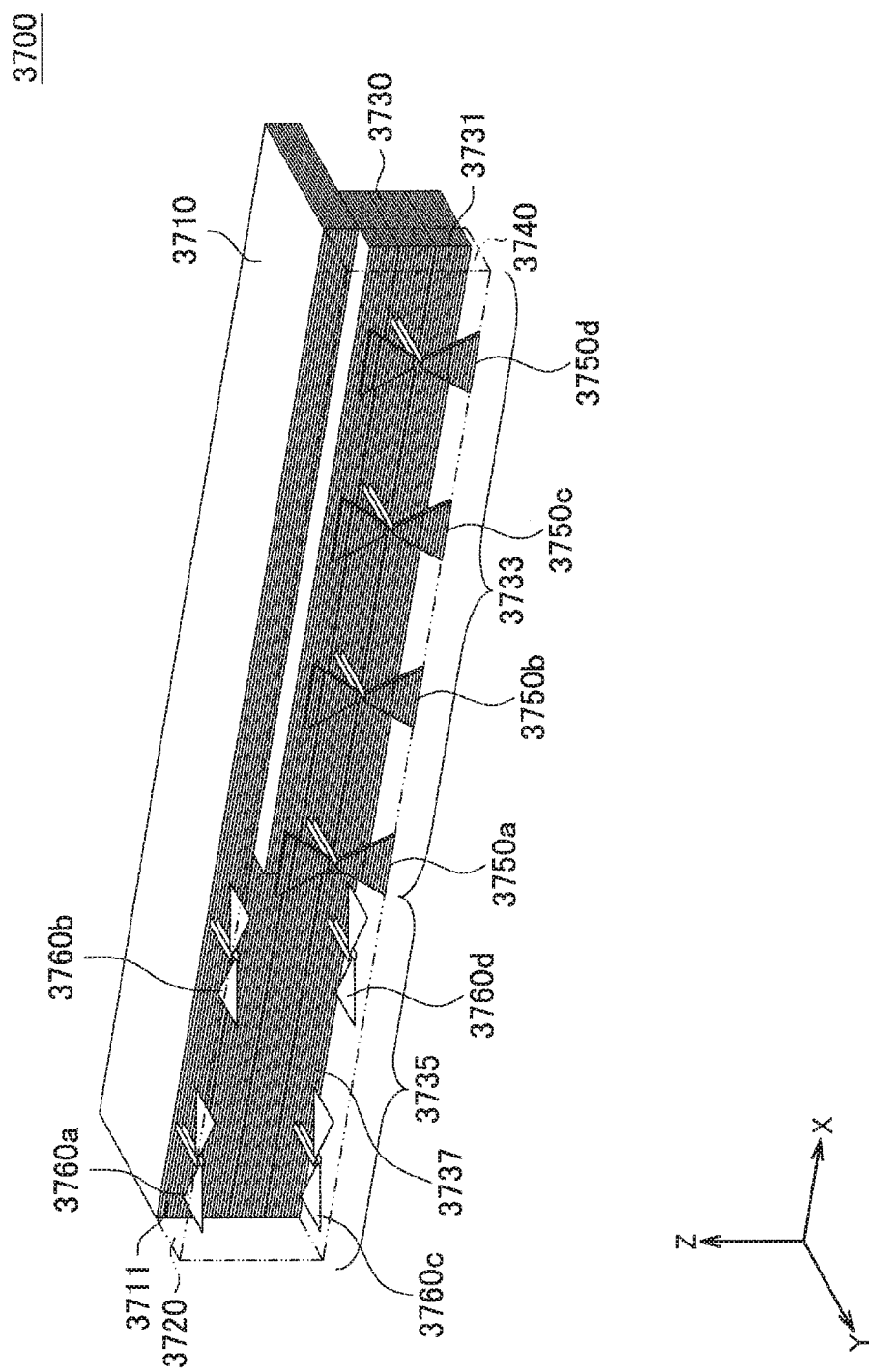
FIG. 27 is an explanatory view for describing a seventh configuration example of the antenna device according to the embodiment.

For example, FIG. 27 is an explanatory view for describing the seventh configuration example of the antenna device according to the present embodiment, and illustrates a schematic perspective view of the antenna device according to the present configuration example. Note that x, y, and z directions in FIG. 27 correspond to the x, y, and z directions in FIGS. 12 to 16.

As illustrated in FIG. 27, the antenna device 3700 includes a first substrate 3710, a second substrate 3730, antenna elements 3750a to 3750d, antenna elements 3760a to 3760d, and dielectrics 3720 and 3740. The first substrate 3710, the second substrate 3730, the dielectric 3720, and the dielectric 3740 respectively correspond to the first substrate 3310, the second substrate 3330, the dielectric 3320, and the dielectric 3340 in the antenna device 3300 illustrated in FIG. 12.

As illustrated in FIG. 27, the plurality of antenna elements 3750 (that is, the antenna elements 3750a to 3750d) is supported on an end 3731 in the +y direction of the second substrate 3730 to be arrayed along the x direction. Furthermore, at this time, the plurality of antenna elements 3750 is supported on the second substrate 3750 to be separated from one another in the x direction.

Meanwhile, the antenna device 3700 is different from the antenna device according to other configuration elements in that a part of the plurality of antenna elements 3760 is supported on the first substrate 3710, and the other part of the antenna elements 3760 is supported by the second substrate 3730.

Specifically, as illustrated in FIG. 27, the second substrate 3730 is supported on the first substrate 3710. At this time, the first substrate 3710 and the second substrate 3730 may have substantially the same width in the x direction.

The antenna elements 3750a to 3750d and the antenna elements 3760c and 3760d are held on a surface extending in the x direction and the z direction of the second substrate 3730. At this time, a region along the x direction of the surface of the second substrate 3730 is divided into a region 3733 and a region 3735 along the x direction. Under such a configuration, the antenna elements 3750a to 3750d are held to be arrayed along the x direction on a portion (hereinafter also referred to as a "surface 3731") corresponding to the region 3733, of the surface extending in the x direction and the z direction of the second substrate 3730. Furthermore, the antenna elements 3760c and 3760d are held to be arrayed along the x direction on a portion (hereinafter also referred to as a "surface 3737") corresponding to the region 3735, of the surface extending in the x direction and the z direction of the second substrate 3730. Note that, in the present configuration example, the antenna elements 3760a and 3760b, of the antenna elements 3760a to 3760d, correspond to an example of "second antenna elements", and the antenna elements 3760c and 3760d correspond to an example of "third antenna elements". Furthermore, the region (for example, the region 37433) where the plurality of antenna elements 3750 is held, of the region along the x direction of the second substrate 3730, corresponds to an example of the "first region", and the region (for example, the region 3735) where the third antenna elements are held corresponds to an example of a "fourth region".

The antenna elements 3760a and 3760b are held to be arrayed along the x direction on an end 3711 of the first substrate 3710. At this time, the antenna elements 3760a and 3760b are held in a region located in the z direction with respect to (for example, a region adjacent in the z direction to) the region 3735 (in other words, the surface 3737) of the second substrate 3730, of the region along the x direction of the end 3711. With such a configuration, the antenna elements 3760a and 3760b held on the first substrate 3710 and the antenna elements 3760c and 3760d held on the second substrate 3730 are held to be adjacent to each other in the z direction.

Furthermore, the antenna elements 3760 are not held in a region located in the z direction with respect to (for example, a region adjacent in the z direction to) the region 3733 (in other words, the surface 3731) of the second substrate 3730, of the region along the x direction of the first substrate 3710. That is, in the antenna device 3700, the antenna elements 3760 are not held in the z direction of the plurality of antenna elements 3750 (for example, the antenna elements 3750a to 3750d).

Note that the surface 3731 may be formed to protrude in the +x direction with respect to the surface 3737. With such a configuration, the antenna elements 3750a to 3750d and the antenna elements 3760c and 3760d held on the second substrate 3730 are separated from each other, and the antenna characteristics can be improved.

Figure 28:
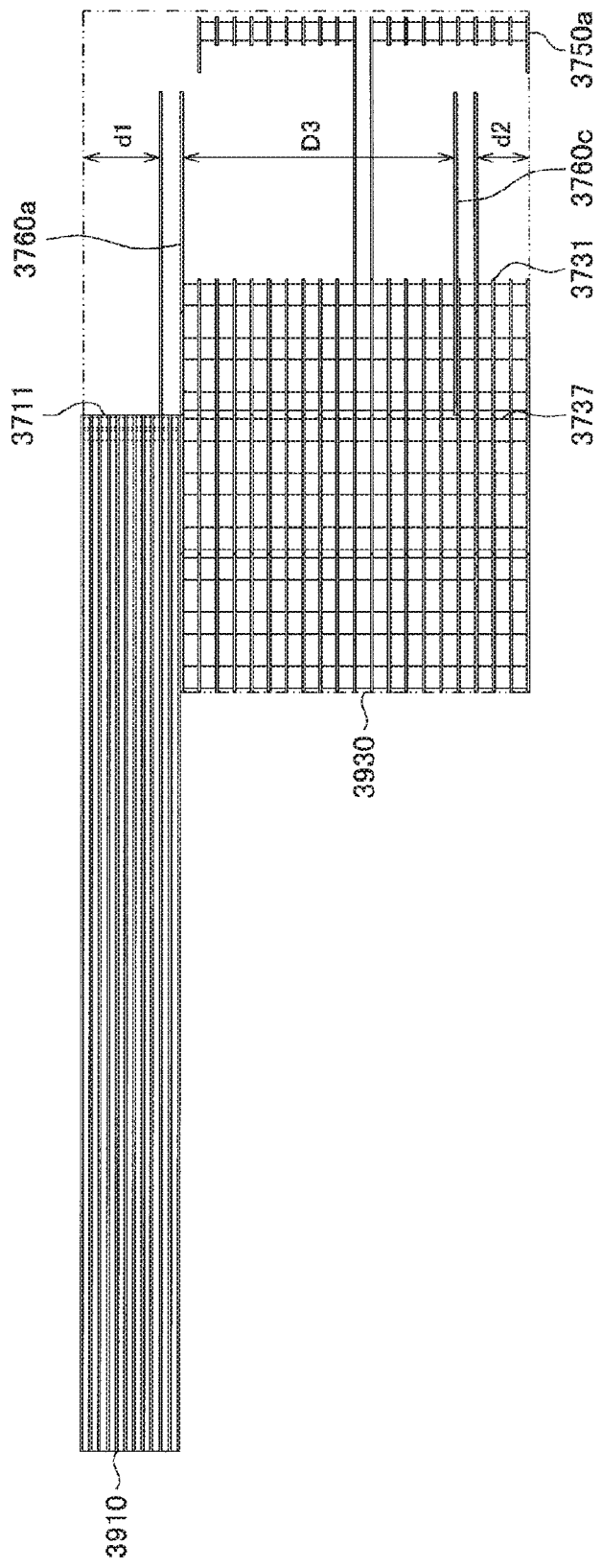
FIG. 28 is an explanatory view for describing the seventh configuration example of the antenna device according to the embodiment.

Here, a more detailed positional relationship between the antenna element 3760 held on the first substrate side and the antenna element 3760 held on the second substrate side will be described in particular focusing on the positional relationship in the z direction with reference to FIG. 28. FIG. 28 is an explanatory view for describing the seventh configuration example of the antenna device according to the present embodiment, and is a view illustrating an example of a configuration of the antenna device 3700 in a case where the antenna device 3700 in FIG. 27 is viewed from the x direction. Note that, in the present description, the positional relationship between the antenna elements 3760a and 3760c held adjacent to each other in the z direction will be described as an example.

In FIG. 28, reference numeral d1 represents an interval in the z direction between a position in the z direction of a surface on the +z direction side of the first substrate 3710 and the antenna element 3760a. Furthermore, reference numeral d2 represents an interval in the z direction between a position in the z direction of an end on the −z direction side of the second substrate 3730 and the antenna element 3760c. Furthermore, reference numeral d3 represents an interval in the z direction between the antenna element 3760a and the antenna element 3760c.

In a case of assuming that the antenna elements 3760a and 3760c are configured as an array antenna, it is desirable to secure an interval of λ/2 or larger (λ is the wavelength of the wireless signal to be transmitted or received) as d3 in order to exhibit favorable antenna characteristics of the antenna elements 3760a and 3760c. Furthermore, the antenna element 3760a is located on a further end side (that is, on an end side in the +z direction) of the dielectric as the d1 becomes narrower, and the directivity of the antenna element 3760a is more easily inclined. Furthermore, the antenna element 3760a is located on a more center side (that is, on a center side in the z direction) of the dielectric as the d1 becomes wider, and the directivity of the antenna element 3760a is less easily inclined. Similarly, the antenna element 3760c is located on a further end side (that is, on an end side in the −z direction) of the dielectric as the d2 becomes narrower, and the directivity of the antenna element 3760c is more easily inclined. Furthermore, the antenna element 3760c is located on a more center side (that is, on a center side in the z direction) of the dielectric as the d2 becomes wider, and the directivity of the antenna element 3760c is less easily inclined.

From the above characteristics, the antenna elements 3760a and 3760c are held to secure wider intervals as d1 and d2 after securing the interval of λ/2 or more as d3, whereby more favorable antenna characteristics can be obtained.

Another example of the configuration of the antenna device according to the present embodiment in the case where the antenna elements 3350 and 3360 according to the third configuration example are arrayed has been described as the seventh configuration example with reference to FIGS. 27 and 28.

3.4. Examples

Next, examples of the antenna device according to the embodiment of the present disclosure will be described. In the present example, an example of a configuration of the antenna device that enables implementation of polarization MIMO for each of wireless signals arriving from different directions, using the antenna device according to the present embodiment, will be described.

Figure 29:
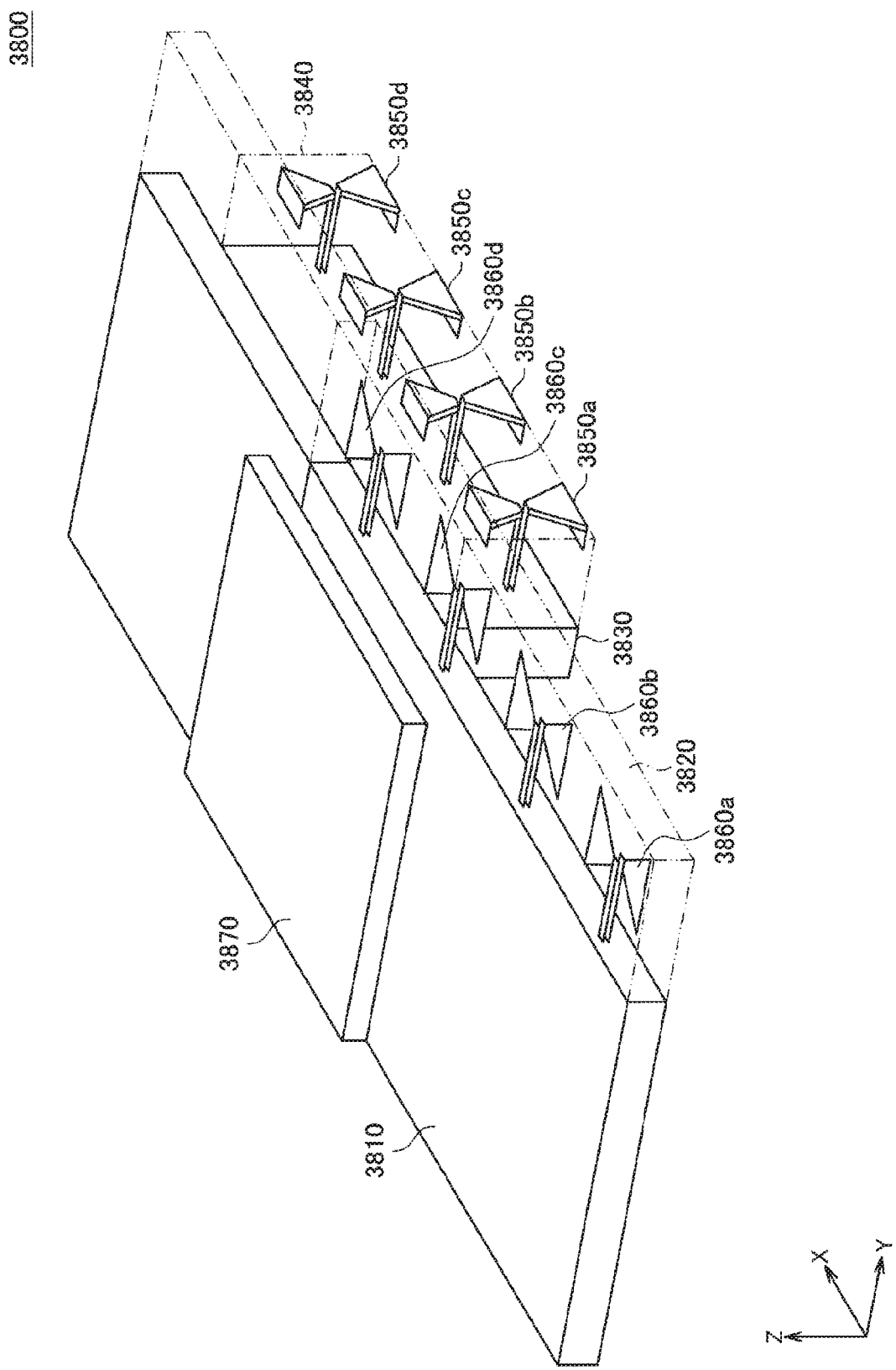
FIG. 29 is an explanatory view for describing an example of the antenna device according to the embodiment.

For example, FIG. 29 is an explanatory view for describing an example of the antenna device according to the present embodiment, and illustrates a schematic perspective view of the antenna device according to the present example. Note that the example illustrated in FIG. 29 illustrates an example of case where a dipole antenna is adopted as an antenna element and the antenna elements are arrayed as described above as the fourth to seventh configuration examples. Furthermore, x, y, and z directions in FIG. 29 correspond to, for example, the x, y, and z directions in FIG. 23. Furthermore, in the following description, the antenna device illustrated in FIG. 29 may be referred to as an "antenna device 3800" to be distinguished from antenna devices according to other configuration examples.

As illustrated in FIG. 29, an antenna device 3800 includes a first substrate 3810, a second substrate 3830, dielectrics 3820 and 3840, antenna elements 3850a to 3850d, antenna elements 3860a to 3860d, and an antenna element 3870. The first substrate 3810, the second substrate 3830, the dielectric 3820, and the dielectric 3840 respectively correspond to, for example, the first substrate 3610, the second substrate 3630, the dielectric 3620, and the dielectric 3640 in the antenna device 3600 illustrated in FIG. 23. Furthermore, the antenna elements 3850a to 3850d and the antenna elements 3860a to 3860d respectively correspond to, for example, the antenna elements 3650a to 3650d and the antenna elements 3660a to 3660d illustrated in FIG. 23. Note that, as the configuration of the antenna device 3800, any of the fourth to seventh configuration examples can be applied. In other words, the positional relationship among the first substrate 3810, the second substrate 3830, the antenna elements 3850a to 3850d, and the antenna elements 3860a to 3860d may be changed as appropriate according to which of the fourth to seventh configuration examples is applied.

Furthermore, as illustrated in FIG. 29, the antenna element 3870 is held on a surface on the +z direction side of the first substrate 3810. As the antenna element 3870, an antenna element capable of transmitting or receiving a polarized wave having a propagation direction substantially coinciding with the z direction and a polarization direction substantially coinciding with the x direction, and a polarized wave having the propagation direction substantially coinciding with the z direction and the polarization direction substantially coinciding with the y direction is favorably applied. As a specific example, the antenna element 3870 may be configured as a patch antenna. Furthermore, as another example, the antenna element 3870 may be configured by a dipole antenna having an element provided to extend in the x direction and a dipole antenna having an element provided to extend in the y direction. Of course, the above is a mere example, and another type of antenna element can be applied. Note that the antenna element 3870 corresponds to an example of a "fourth antenna element".

The antenna device 3800 transmits or receives the polarized wave having the polarization direction substantially coinciding with the x direction, of the wireless signals having the propagation direction substantially coinciding with the y direction, using the antenna elements 3860a to 3860d on the basis of the configuration. Furthermore, the antenna device 3800 transmits or receives the polarized wave having the polarization direction substantially coinciding with the z direction, of the wireless signals having the propagation direction substantially coinciding with the y direction, using the antenna elements 3850a to 3850d. Further, the antenna device 3800 transmits or receives the polarized wave having the polarization direction substantially coinciding with the x direction and the polarized wave having the polarization direction substantially coinciding with the y direction, of the wireless signals having the propagation direction substantially coinciding with the z direction, using the antenna element 3870. That is, the antenna device 3800 according to the present example can implement the polarization MIMO for both the wireless signal arriving from the y direction and the wireless signal arriving from the z direction.

Figure 30:
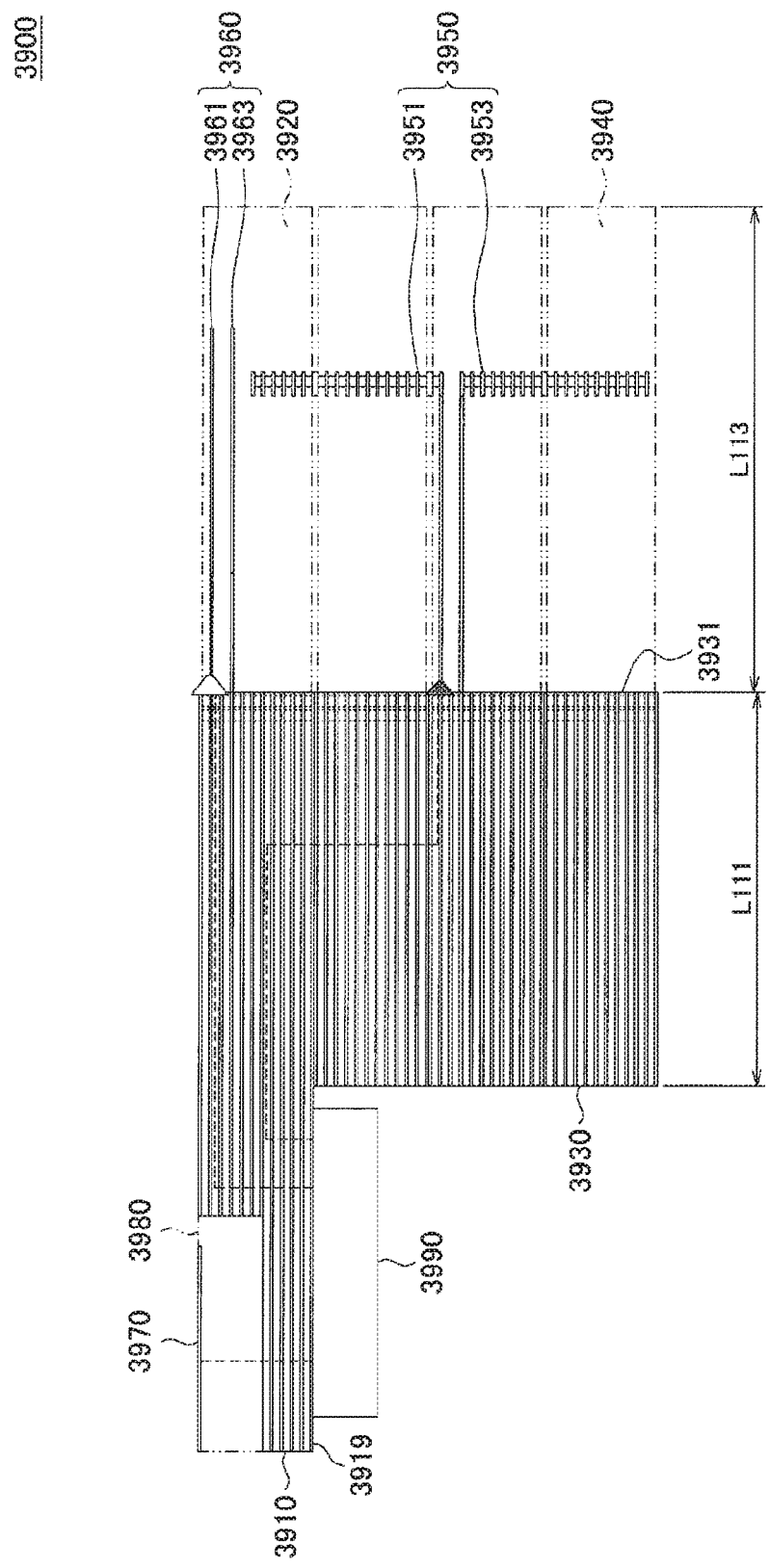
FIG. 30 is an explanatory view for describing an example of the antenna device according to the embodiment.

Next, an example of the configuration of the antenna device according to the present example will be described in more detail on the assumption that the antenna device is mounted on a communication device such as a smartphone (especially, a thin communication device). For example, FIG. 30 is an explanatory view for describing an example of the antenna device according to the present embodiment, and illustrates an example of a configuration of the antenna device according to the present example. x, y, and z directions in FIG. 30 correspond to the x, y, and z directions in FIG. 29. Furthermore, in the following description, the antenna device illustrated in FIG. 30 may be referred to as an "antenna device 3900" to be distinguished from antenna devices according to other configuration examples.

As illustrated in FIG. 30, the antenna device 3900 includes a first substrate 3910, a second substrate 3930, dielectrics 3920, 3940, and 3980, an antenna element 3950, an antenna element 3960, an antenna element 3970, and a control circuit 3990.

The first substrate 3910, the second substrate 3930, the dielectric 3920, and the dielectric 3940 respectively correspond to, for example, the first substrate 3810, the second substrate 3830, the dielectric 3820, and the dielectric 3840 in the antenna device 3800 illustrated in FIG. 29. Furthermore, the antenna element 3950, the antenna element 3960, and the antenna element 3970 respectively correspond to the antenna elements 3850a to 3850d, the antenna elements 3860a to 3860d, and the antenna element 3870 in the antenna device 3800 illustrated in FIG. 29. Furthermore, in the example illustrated in FIG. 30, each of the antenna elements 3950 and 3960 is configured as a dipole antenna. That is, the antenna element 3950 includes elements 3961 and 3963. Furthermore, the antenna element 3960 includes elements 3951 and 3953. Furthermore, in the example illustrated in FIG. 30, the antenna element 3970 is configured as a patch antenna.

The antenna element 3970 is held on a surface (a surface on the +z direction side) of a surface extending in the x direction and the y direction of the first substrate 3910 via the dielectric 3980.

Furthermore, the control circuit 3990 may be held on a back surface (a surface on the −z direction side) of the surface extending in the x direction and the y direction of the first substrate 3910 on the −y direction side (that is, the opposite surface side of the surface 3931 where the antenna element 3950 is held) of the second substrate 3930. The control circuit 3990 is electrically connected to at least a part of the antenna elements 3950, 3960, and 3970, for example, and controls driving of the antenna element. At this time, the control circuit 3990 and the antenna element to be driven (for example, the antenna element 3950, 3960, and 3970) are connected via a wiring layer of at least either the first substrate 3910 or the second substrate 3930. Therefore, in the case of controlling driving of the antenna element 3950 by the control circuit 3990, for example, it is desirable to secure a width of about 3 mm or more as a thickness L111 in the y direction of the second substrate 3930, assuming implementation of the wiring and a via connecting the wiring layers of the second substrate 3930 in the z direction.

Furthermore, in a case of assuming transmission or reception of a wireless signal of a 28 GHz band (for example, 26.5 GHz to 29.5 GHz), it is desirable to secure a width of about 3 mm as a thickness L113 in the y direction of a region where the antenna elements 3950 and 3960 and the dielectrics 3920 and 3940 are formed.

Note that, according to the antenna device 3900 illustrated in FIG. 30, the thickness in the z direction of the first substrate 3910 can be suppressed to about 1 mm.

As described above, an example of the configuration of the antenna device that enables implementation of polarization MIMO for each of wireless signals arriving from different directions, using the antenna device according to the present embodiment, has been described as an example with reference to FIGS. 29 and 30.

3.5 Application

Next, as an application of a communication device to which the antenna device according to the embodiment of the present disclosure is applied, an example of a case of applying the technology according to the present disclosure to a device other than a communication terminal such as a smartphone will be described.

In recent years, a technology called Internet of Things (IoT) that connects various things to a network has attracted attention, and devices other than smartphones and tablet terminals are assumed to be able to be used for communication. Therefore, for example, by applying the technology according to the present disclosure to various devices configured to be movable, the devices become able to communicate using millimeter waves and to use polarization MIMO in the communication.

Figure 31:
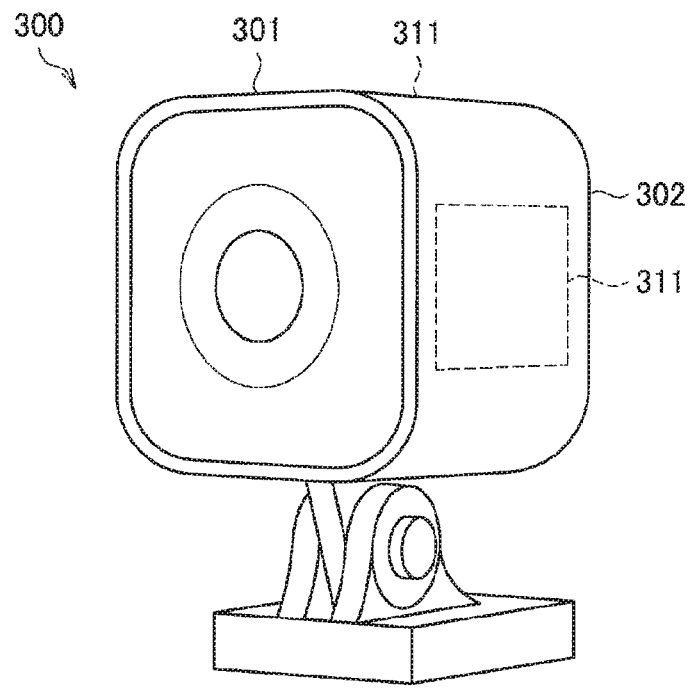
FIG. 31 is an explanatory view for describing an application of a communication device according to the embodiment.

For example, FIG. 31 is an explanatory view for describing an application of the communication device according to the present embodiment, illustrating an example of a case of applying the technology according to the present embodiment to a camera device. Specifically, in the example illustrated in FIG. 31, the antenna device according to the embodiment of the present disclosure is held to be located near each of surfaces 301 and 302 facing different directions from each other, of external surfaces of a housing of a camera device 300. For example, the reference numeral 311 schematically denotes the antenna device according to the embodiment of the present disclosure. With such a configuration, the camera device 300 illustrated in FIG. 31 can transmit or receive each of a plurality of polarized waves propagating in directions substantially coincident with the normal directions of the surfaces 301 and 302, and having different polarization directions from each other, for example. Note that, needless to say, the antenna device 311 may be provided not only on the surfaces 301 and 302 illustrated in FIG. 31 but also on other surfaces.

Figure 32:
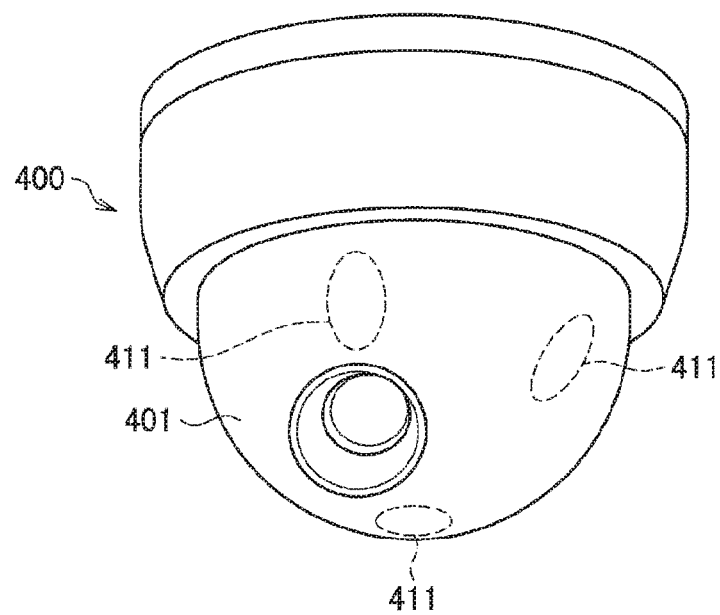
FIG. 32 is an explanatory view for describing an application of the communication device according to the embodiment.

Furthermore, the technology according to the present disclosure can also be applied to an unmanned aircraft called drone, for example. For example, FIG. 32 is an explanatory view for describing an application of the communication device according to the present embodiment, illustrating an example of a case of applying the technology according to the present embodiment to a camera device installed in a lower portion of a drone. Specifically, in the case of a drone flying in a high place, it is desirable for the drone to transmit or receive a wireless signal (millimeter wave) arriving from each direction mainly on a lower side. Therefore, for example, in the example illustrated in FIG. 32, the antenna device according to the embodiment of the present disclosure is held to be located near each of portions facing different directions from each other, of an outer surface 401 of a housing of a camera device 400 installed in a lower portion of the drone. For example, the reference numeral 411 schematically denotes the antenna device according to the embodiment of the present disclosure. Furthermore, although not illustrated in FIG. 32, the antenna device 411 may be provided not only in the camera device 400 but also in each portion of the housing of the drone itself, for example. Even in this case, the antenna device 411 is favorably provided on, in particular, the lower side of the housing.

Note that, as illustrated in FIG. 32, in a case where at least a part of the external surface of the housing of the target device is curved (that is, is a curved surface), the antenna devices 411 are favorably held near a plurality of partial regions having normal directions intersecting with each other or twisted relative to each other, of partial regions in the curved surface. With such a configuration, the camera device 400 illustrated in FIG. 32 can transmit or receive each of a plurality of polarized waves propagating in the directions substantially coincident with the normal directions of the partial regions and having different polarization directions from each other.

Note that the examples described with reference to FIGS. 31 and 32 are mere examples, and the application destination of the technology according to the present disclosure is not particularly limited as long as the destination is a device capable of performing communication using millimeter waves.

As an application of the communication device to which the antenna device according to the embodiment of the present disclosure is applied, examples of the cases of applying the technology according to the present disclosure to devices other than a communication terminal such as a smartphone have been described with reference to FIGS. 31 and 32.

4. CONCLUSION

As described above, the antenna device according to the present embodiment includes the first substrate extending in the first direction and the second substrate supported on the first substrate, and extending in both the first direction and the second direction orthogonal to the first direction. Furthermore, the antenna element is supported by the surface of the second substrate, the surface having the normal direction substantially coinciding with the third direction orthogonal to both the first direction and the second direction, and configured to transmit or receive the wireless signal having the polarization direction substantially coinciding with the second direction. With such a configuration, according to the antenna of the present embodiment, the polarized wave having the polarization direction substantially coinciding with the thickness direction (second direction) of the antenna device can be transmitted or received, and the thickness can be formed thinner.

Furthermore, the antenna element provided on the second substrate may be configured as a dipole antenna including the element extending in the second direction, and the dipole antenna having the element extending in the first direction may be separately provided on the end side in the third direction of the first substrate. With such a configuration, the antenna device according to the present embodiment can transmit or receive the polarized wave having the polarization direction substantially coinciding with the first direction and the polarized wave having the polarization direction substantially coinciding with the second direction, of the wireless signals propagating in the third direction. That is, with such a configuration, according to the antenna device of the present embodiment, the polarization MIMO can be implemented for the wireless signal having the propagation direction substantially coinciding with the third direction.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)
An antenna device including:
a first substrate extending in a first direction;
a second substrate supported on the first substrate, and extending in both the first direction and a second direction orthogonal to the first direction; and
an antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction.

(2)
The antenna device according to (1), in which
the second substrate is supported on an end side in the third direction on a surface of the first substrate, the surface having a normal direction substantially coinciding with the second direction, and
the antenna device further including:
a second antenna element different from a first antenna element that is the antenna element, supported on the end side in the third direction of the first substrate, and configured to transmit or receive a wireless signal having a polarization direction substantially coinciding with the first direction.

(3)
The antenna device according to (2), in which the first antenna element includes a first element extending in the second direction.

(4)
The antenna device according to (3), in which the first element is formed by stacking, in the second direction, a plurality of members extending in the first direction.

(5)
The antenna device according to any one of (2) to (4), in which the second antenna element includes a second element extending in the first direction.

(6)
The antenna device according to any one of (2) to (5), in which at least either the first antenna element or the second antenna element is configured as a dipole antenna.

(7)
The antenna device according to any one of (2) to (6), further including:
a plurality of at least either the first antenna elements or the second antenna elements, in which
the plurality of antenna elements is supported to be separated from one another along the first direction.

(8)
The antenna device according to (7), further including:
a plurality of both the first antenna elements and the second antenna elements, in which
the second substrate is supported with respect to the first substrate such that at least a part in the first direction of one region that is either a first region in which the plurality of first antenna elements is disposed in the first direction or a second region in which the plurality of second antenna elements is disposed in the first direction is adjacent to the other region in the second direction.

(9)
The antenna device according to (8), further including:
a first dielectric provided to include at least the first region on a surface of the second substrate on which the plurality of first antenna elements is supported; and
a second dielectric provided to include at least the second region on an end of the first substrate on which the plurality of second antenna elements is supported, in which
the second substrate is supported with respect to the first substrate such that a dielectric of either the first dielectric or the second dielectric, the dielectric being provided to include the other region, is adjacent in the second direction to only a part in the first direction of the one region.

(10)
The antenna device according to (9), in which the second substrate is supported with respect to the first substrate such that one substrate that is either the first substrate or the second substrate protrudes in the first direction with respect to an end in the first direction of the other substrate.

(11)
The antenna device according to (8), in which the second substrate is supported with respect to the first substrate such that at least a partial region in the first direction of the other region is adjacent in the second direction to the entire one region in the first direction.

(12)
The antenna device according to (7), further including:
a plurality of both the first antenna elements and the second antenna elements, in which
the second substrate is supported with respect to the first substrate such that the first region where the plurality of first antenna elements is disposed in the first direction is adjacent in the second direction to a third region of a region along the first direction of the first substrate, the third region being different from the second region where the plurality of second antenna elements is disposed in the first direction.

(13)

The antenna device according to (7), further including:

a plurality of both the first antenna elements and the second antenna elements; and a third antenna element supported with respect to a fourth region of a region along the first direction of the second substrate, the fourth region being different from the first region where the plurality of first antenna elements is disposed, and configured to transmit or receive a wireless signal having a polarization direction substantially coinciding with the first direction, in which the plurality of first antenna elements is supported in a region adjacent in the second direction to the fourth region, the region being of a region along the first direction of the first substrate.

(14)

The antenna device according to (13), in which the first region is formed to protrude in the third direction with respect to the fourth region.

(15)

The antenna device according to (1), in which the antenna element is configured as a planar antenna that transmits or receives each of a first wireless signal that is the wireless signal and a second wireless signal having a polarization direction substantially coinciding with the first direction.

(16)

The antenna device according to (15), further including:

a plurality of the antenna elements, in which the plurality of antenna elements is supported to be separated from one another along the first direction.

(17)

The antenna device according to any one of (1) to (16), in which the first substrate includes a surface located on an opposite side to a direction in which the second substrate extends in the second direction, and having a normal direction substantially coinciding with an opposite direction to the second direction, and a fourth antenna element different from a first antenna element that is the antenna element on the surface.

(18)

The antenna device according to (17), further including:

a drive circuit held in a region located on an opposite side of a surface where the first antenna element of the second substrate is provided, the region being of an opposite surface of a surface where the fourth antenna element of the first substrate is supported, in which the drive circuit is electrically connected to at least either the first antenna element or the fourth antenna element.

REFERENCE SIGNS LIST

1 System
100 Base station
200 Terminal device
2003 Wireless communication unit
2005 Communication control unit
2007 Storage unit
3300 Antenna device
3310 First substrate
3311 End
3320 Dielectric
3330 Second substrate
3340 Dielectric
3350 Antenna element
3351 Element
3352 Element
3353 Feeding point
3360 Antenna element
3361 Element
3362 Element
3363 Feeding point

The invention claimed is:

1. An antenna device comprising:
a first substrate extending in a first direction;
a second substrate supported on the first substrate, and extending in both the first direction and a second direction orthogonal to the first direction; and
an antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction, wherein
the antenna element includes an element formed by stacking, in the second direction, a plurality of members extending in the first direction.

2. An antenna device comprising:
a first substrate extending in a first direction;
a second substrate supported on the first substrate, and extending in both the first direction and a second direction orthogonal to the first direction; and
a first antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction, wherein
the second substrate is supported on an end side in the third direction on a surface of the first substrate, the surface having a normal direction substantially coinciding with the second direction, and
the antenna device further comprising:
a second antenna element different from the first antenna element, supported on the end side in the third direction of the first substrate, and configured to transmit or receive a wireless signal having a polarization direction substantially coinciding with the first direction.

3. The antenna device according to claim 2, wherein the first antenna element includes a first element extending in the second direction.

4. The antenna device according to claim 3, wherein the first element is formed by stacking, in the second direction, a plurality of members extending in the first direction.

5. The antenna device according to claim 2, wherein the second antenna element includes a second element extending in the first direction.

6. The antenna device according to claim 2, wherein at least either the first antenna element or the second antenna element is configured as a dipole antenna.

7. The antenna device according to claim 2, further comprising:
a plurality of at least either the first antenna elements or the second antenna elements, wherein
the plurality of antenna elements is supported to be separated from one another along the first direction.

8. The antenna device according to claim 7, further comprising:
a plurality of both the first antenna elements and the second antenna elements, wherein
the second substrate is supported with respect to the first substrate such that at least a part in the first direction of one region that is either a first region in which the plurality of first antenna elements is disposed in the first direction or a second region in which the plurality of second antenna elements is disposed in the first direction is adjacent to the other region in the second direction.

9. The antenna device according to claim 8, further comprising:
a first dielectric provided to include at least the first region on a surface of the second substrate on which the plurality of first antenna elements is supported; and
a second dielectric provided to include at least the second region on an end of the first substrate on which the plurality of second antenna elements is supported, wherein
the second substrate is supported with respect to the first substrate such that a dielectric of either the first dielectric or the second dielectric, the dielectric being provided to include the other region, is adjacent in the second direction to only a part in the first direction of the one region.

10. The antenna device according to claim 9, wherein the second substrate is supported with respect to the first substrate such that one substrate that is either the first substrate or the second substrate protrudes in the first direction with respect to an end in the first direction of the other substrate.

11. The antenna device according to claim 8, wherein the second substrate is supported with respect to the first substrate such that at least a partial region in the first direction of the other region is adjacent in the second direction to the entire one region in the first direction.

12. The antenna device according to claim 7, further comprising:
a plurality of both the first antenna elements and the second antenna elements, wherein
the second substrate is supported with respect to the first substrate such that the first region where the plurality of first antenna elements is disposed in the first direction is adjacent in the second direction to a third region of a region along the first direction of the first substrate, the third region being different from the second region where the plurality of second antenna elements is disposed in the first direction.

13. The antenna device according to claim 7, further comprising:
a plurality of both the first antenna elements and the second antenna elements; and
a third antenna element supported with respect to a fourth region of a region along the first direction of the second substrate, the fourth region being different from the first region where the plurality of first antenna elements is disposed, and configured to transmit or receive a wireless signal having a polarization direction substantially coinciding with the first direction, wherein
the plurality of first antenna elements is supported in a region adjacent in the second direction to the fourth region, the region being of a region along the first direction of the first substrate.

14. The antenna device according to claim 13, wherein the first region is formed to protrude in the third direction with respect to the fourth region.

15. The antenna device according to claim 1, wherein the antenna element is configured as a planar antenna that transmits or receives each of a first wireless signal that is the wireless signal and a second wireless signal having a polarization direction substantially coinciding with the first direction.

16. The antenna device according to claim 15, further comprising:
a plurality of the antenna elements, wherein
the plurality of antenna elements is supported to be separated from one another along the first direction.

17. An antenna device comprising:
a first substrate extending in a first direction;
a second substrate supported on the first substrate, and extending in both the first direction and a second direction orthogonal to the first direction; and
an antenna element supported on a surface of the second substrate, the surface having a normal direction substantially coinciding with a third direction orthogonal to both the first direction and the second direction, and configured to transmit or receive a wireless signal having a polarization direction substantially coinciding with the second direction, wherein
the first substrate includes
a surface located on an opposite side to a direction in which the second substrate extends in the second direction, and having a normal direction substantially coinciding with an opposite direction to the second direction, and
a fourth antenna element different from a first antenna element that is the antenna element on the surface.

18. The antenna device according to claim 17, further comprising:
a drive circuit held in a region located on an opposite side of a surface where the first antenna element of the second substrate is provided, the region being of an opposite surface of a surface where the fourth antenna element of the first substrate is supported, wherein
the drive circuit is electrically connected to at least either the first antenna element or the fourth antenna element.

* * * * *